US009875409B2

(12) United States Patent
Ohmura et al.

(10) Patent No.: US 9,875,409 B2
(45) Date of Patent: Jan. 23, 2018

(54) ABNORMALITY DETECTION APPARATUS, ABNORMALITY DETECTION METHOD, AND RECORDING MEDIUM STORING ABNORMALITY DETECTION PROGRAM

(71) Applicants: Keiji Ohmura, Kanagawa (JP); Aiko Ohtsuka, Kanagawa (JP); Kazuya Takahashi, Kanagawa (JP)

(72) Inventors: Keiji Ohmura, Kanagawa (JP); Aiko Ohtsuka, Kanagawa (JP); Kazuya Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 153 days.

(21) Appl. No.: 14/815,786

(22) Filed: Jul. 31, 2015

(65) Prior Publication Data

US 2016/0034784 A1  Feb. 4, 2016

(30) Foreign Application Priority Data

Aug. 1, 2014  (JP) ................................ 2014-157696

(51) Int. Cl.
| | |
|---|---|
| *G06K 9/00* | (2006.01) |
| *G06T 7/20* | (2017.01) |
| *G06T 7/254* | (2017.01) |
| *G06K 9/62* | (2006.01) |
| *G08B 13/196* | (2006.01) |

(52) U.S. Cl.
CPC ....... *G06K 9/00771* (2013.01); *G06K 9/6254* (2013.01); *G06T 7/20* (2013.01); *G06T 7/254* (2017.01); *G08B 13/19613* (2013.01); *G06T 2207/30232* (2013.01)

(58) Field of Classification Search
CPC .. G06T 7/20; G06T 7/254; G06T 2207/30232
See application file for complete search history.

(56) References Cited

U.S. PATENT DOCUMENTS

| | | | | | |
|---|---|---|---|---|---|
| 5,831,669 | A | * | 11/1998 | Adrain | ................... H04N 7/181 348/143 |
| 6,441,734 | B1 | * | 8/2002 | Gutta | ............... G08B 13/19602 340/541 |
| 6,947,073 | B1 | * | 9/2005 | Seal | ........................ G06T 7/254 348/143 |

(Continued)

FOREIGN PATENT DOCUMENTS

JP  2012-023566  2/2012

*Primary Examiner* — Utpal Shah
(74) *Attorney, Agent, or Firm* — Duft Bornsen & Fettig LLP

(57) ABSTRACT

An abnormality detection apparatus, an abnormality detection method, and an abnormality detection program are provided. Each of the abnormality detection apparatus, an abnormality detection method, and an abnormality detection program extracts a target image to be monitored and a reference image, respectively, from target video to be monitored, detects an abnormality based on a difference between the target image to be monitored and the reference image, and displays an image indicating a difference between the target image to be monitored and the reference image on a monitor. Moreover, an abnormality detection system is provided including the abnormality detection apparatus, a video that captures an image of a target to be monitored, and a monitor.

16 Claims, 25 Drawing Sheets

(56) References Cited

U.S. PATENT DOCUMENTS

| | | | | |
|---|---|---|---|---|
| 7,864,980 | B2 * | 1/2011 | Evans | G06K 9/00771 |
| | | | | 348/154 |
| 8,285,034 | B2 * | 10/2012 | Rajaraman | G06Q 10/087 |
| | | | | 382/162 |
| 2007/0122000 | A1 * | 5/2007 | Venetianer | G06K 9/00771 |
| | | | | 382/103 |
| 2008/0247601 | A1 * | 10/2008 | Ito | G06K 9/00771 |
| | | | | 382/103 |
| 2012/0148103 | A1 * | 6/2012 | Hampel | G06K 9/00771 |
| | | | | 382/103 |
| 2015/0097959 | A1 * | 4/2015 | Hu | H04N 7/183 |
| | | | | 348/155 |
| 2015/0130946 | A1 | 5/2015 | Omura et al. | |
| 2015/0269745 | A1 * | 9/2015 | Klimer | G06T 7/194 |
| | | | | 382/103 |
| 2016/0063344 | A1 * | 3/2016 | Fan | G06K 9/4604 |
| | | | | 382/103 |
| 2016/0132733 | A1 * | 5/2016 | Kundu | A47F 9/045 |
| | | | | 348/150 |

* cited by examiner

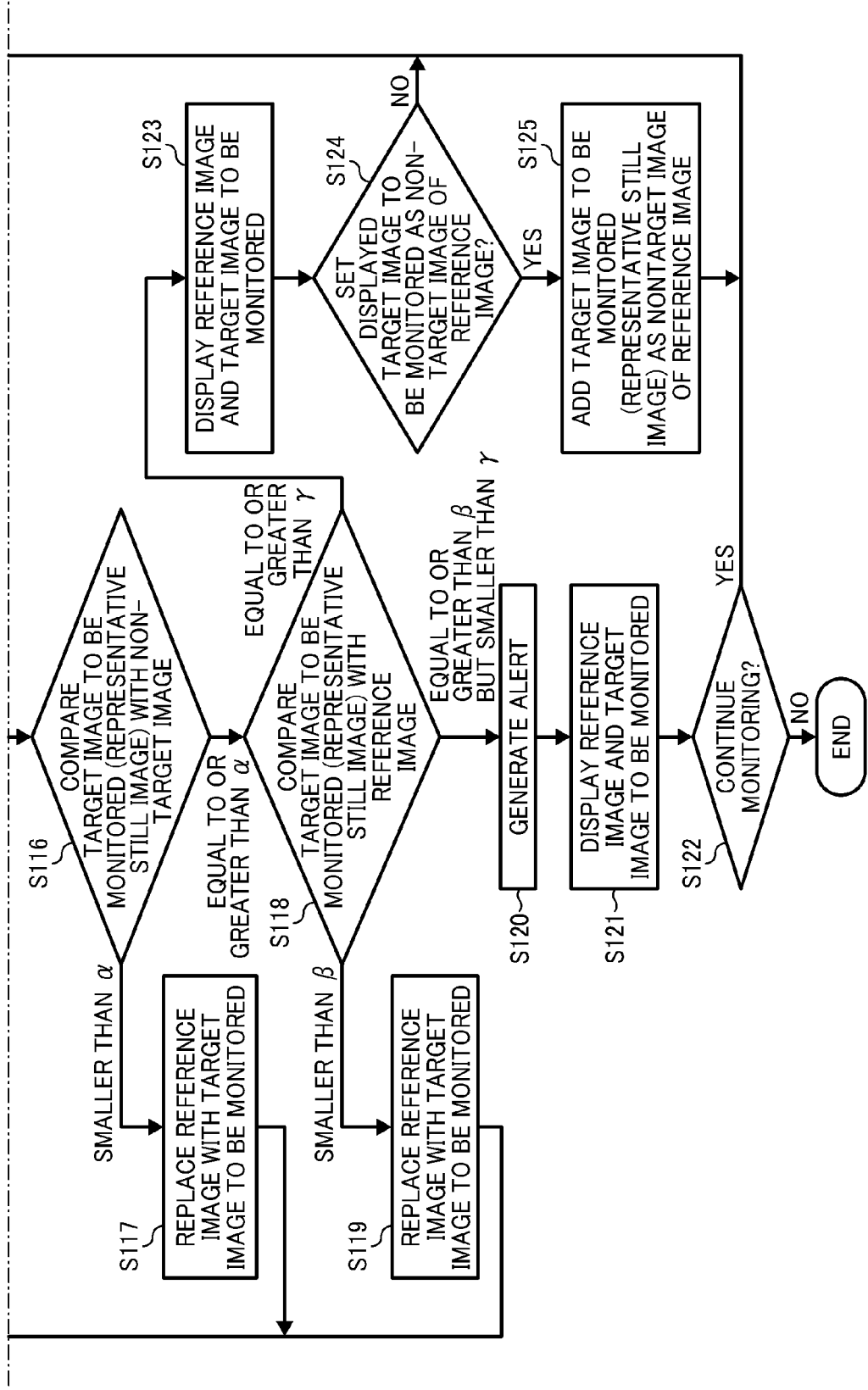

FIG. 4

| FRAME NUMBER | RATIO OF NUMBER OF PIXELS (%) |
|---|---|
| . | . |
| 10 | 70 |
| 11 | 85 |
| 12 | 6 |
| 13 | 11 |
| 14 | 8 |
| 15 | 16 |
| 16 | 6 |
| 17 | 11 |
| 18 | 0 |
| 19 | 19 |
| 20 | 5 |
| 21 | 6 |
| 22 | 7 |
| 23 | 45 |
| 24 | 55 |
| 25 | 33 |
| 26 | 83 |
| 27 | 63 |
| 28 | 92 |
| 29 | 13 |
| 30 | 6 |
| 31 | 7 |
| 32 | 17 |
| 33 | 5 |
| 34 | 12 |
| 35 | 30 |
| . | . |

FIG. 6

| GROUP OF STILL IMAGES | FRAME NUMBER | RATIO OF NUMBER OF PIXELS (%) |
|---|---|---|
| . | . | . |
| A | 12 | 6 |
| A | 14 | 8 |
| A | 16 | 6 |
| A | 18 | 0 |
| A | 20 | 5 |
| A | 21 | 6 |
| A | 22 | 7 |
| B | 30 | 6 |
| B | 31 | 7 |
| B | 33 | 5 |
| . | . | . |

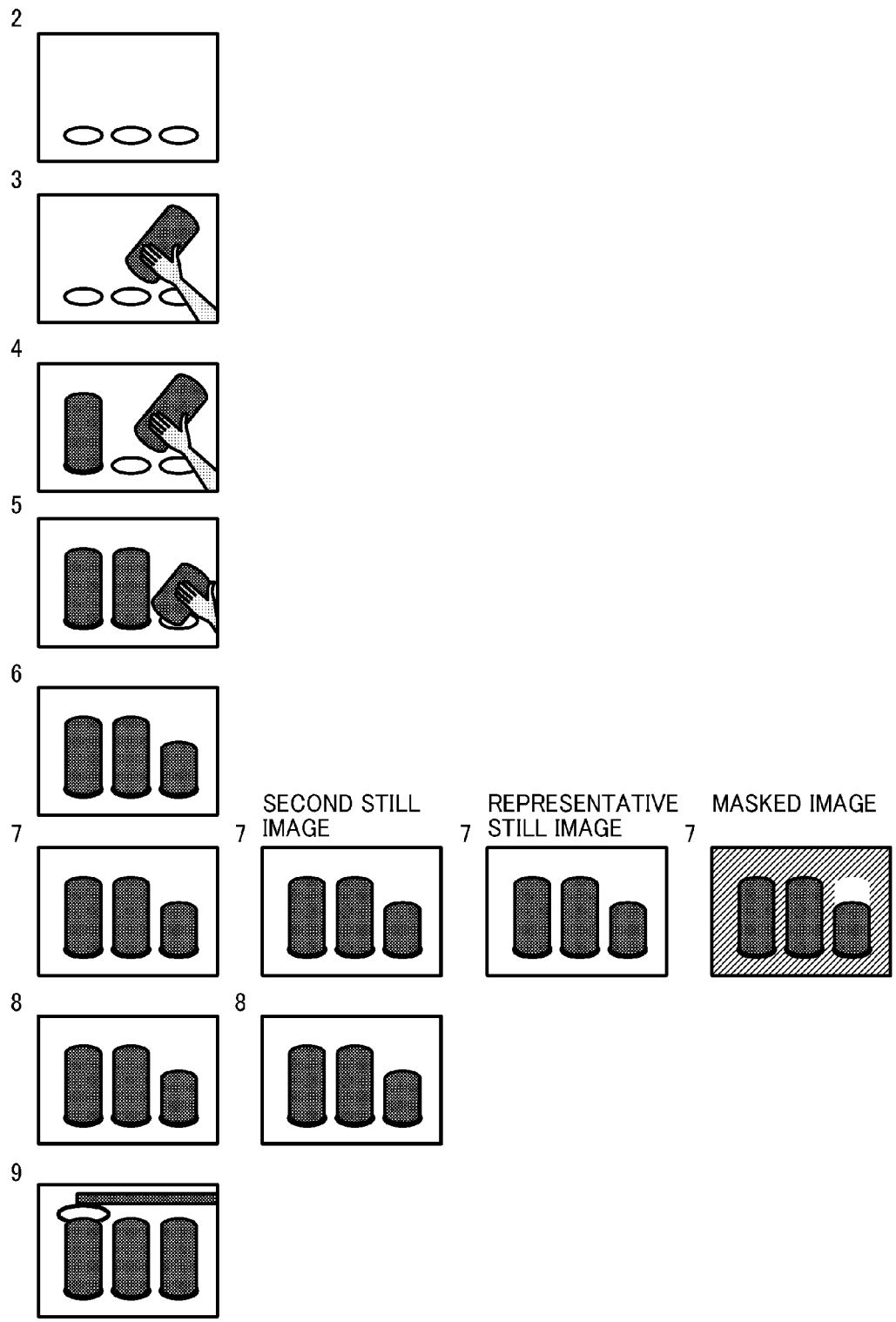

ABNORMALITY DETECTION APPARATUS, ABNORMALITY DETECTION METHOD, AND RECORDING MEDIUM STORING ABNORMALITY DETECTION PROGRAM

CROSS-REFERENCE TO RELATED APPLICATION

This patent application is based on and claims priority pursuant to 35 U.S.C. §119(a) to Japanese Patent Application No. 2014-157696, filed on Aug. 1, 2014, in the Japan Patent Office, the entire disclosure of which is hereby incorporated by reference herein.

BACKGROUND

Technical Field

Example embodiments of the present invention relate to an abnormality detection apparatus, abnormality detection method, and a recording medium storing an abnormality detection program.

Background Art

In recent years, in addition to abnormality detection apparatuses that detect an abnormality using sensors such as infrared sensors or temperature sensors, abnormality detection apparatuses that detect an abnormality from changes in images using video data are known. Such abnormality detection apparatuses are used, for example, for monitoring systems, and such abnormality detection apparatuses detect an abnormality based on changes in pixel value at pixel positions of a frame obtained from video data.

Some abnormality detection apparatuses are known that record the video captured under normal conditions or the video captured under abnormal conditions (more specifically, changes over time in pixel value) in advance and compare an image with the recorded video to detect an abnormality under the assumption that pixel values change on the video data to be monitored when an object makes certain movements or the like.

SUMMARY

Embodiments of the present invention described herein provide an abnormality detection apparatus, an abnormality detection method, a recording medium storing an abnormality detection program, and an abnormality detection system. Each of the abnormality detection apparatus, an abnormality detection method, and an abnormality detection program extracts a target image to be monitored and a reference image from target video to be monitored, detects an abnormality based on a difference between the target image to be monitored and the reference image, and displays an image indicating a difference between the target image to be monitored and the reference image on a monitor. The abnormality detection system includes the abnormality detection apparatus, a video that captures an image of a target to be monitored, and a monitor.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 3A, FIG. 3B, and FIG. 3C is a flowchart of the processes performed in an abnormality detection apparatus where reference video is firstly read, and then an abnormality is detected from a target image to be monitored and an alert is generated, according to an example embodiment of the present invention.

FIG. 4 is a diagram depicting frame comparison data according to an example embodiment of the present invention.

FIG. 6 is a diagram depicting still image data according to an example embodiment of the present invention.

FIG. 16 illustrates the target video to be monitored (frame numbers 2 to 9) that is stored in a video data storage unit on a frame-by-frame basis, according to an example embodiment of the present invention.

Figure 1:
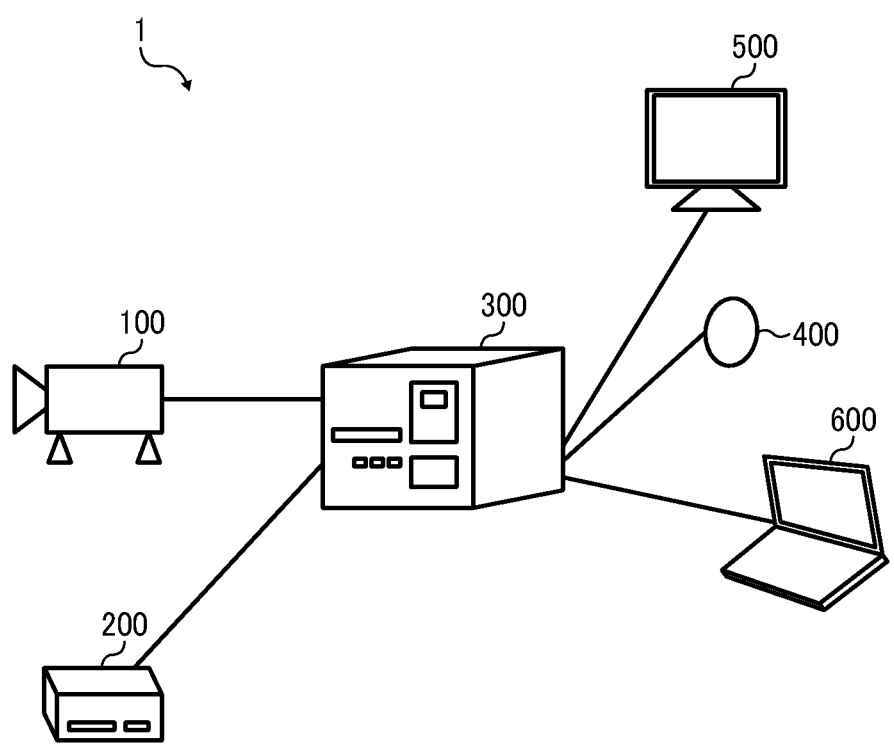
FIG. 1 is a schematic block diagram of an abnormality detection apparatus according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments of the present invention are described below with reference to the drawings. FIG. 1 is a schematic block diagram of an abnormality detection apparatus according to an example embodiment of the present invention. An abnormality detection apparatus 300 is connected to a video 100, an external storage device 200, an input device 400, a monitor 500, and an externally connected device 600, and configures an abnormality detection system 1.

The video 100 is, for example, a camcorder, an Internet protocol (IP) camera, and a web camera that capture an object, and provides streaming video to the abnormality detection apparatus 300. In the present example embodiment, the video obtained by recording an object by the video 100 for monitoring purposes is referred to as target video to be monitored. Moreover, in the present example embodiment, the still image that is extracted from the target video to be monitored under certain specified conditions and is obtained by a prescribed method is referred to as a target image to be monitored.

The video 100 includes a time management unit that manages the capturing time, and a unique identification (ID) unit that stores unique ID (identification information) in the video 100, and associates the capturing time and the unique ID with the video data as metadata when the video is recorded. The video 100 may serve as an external video data storage unit in addition to a video data storage unit 350 (see FIG. 2) integrated into the abnormality detection apparatus 300, and is capable of storing the recorded video data on its own. Accordingly, the video data that is stored in the video 100 may be transferred to the abnormality detection apparatus 300.

The external storage device 200 is a large-capacity storage device such as a hard disk drive, and stores the video data that is recorded by videos other than the video 100. When video data is recorded by a video other than the video 100 and the recorded video data is stored in that video, that video may serve as the external storage device 200. In such cases, the video data may be transferred to the abnormality detection apparatus 300, for example, by inserting the memory card of that video to a memory slot 320 of the abnormality detection apparatus 300, or by connecting a universal serial bus (USB) cable to a USB etc. connection interface (I/F) 330 (see FIG. 2). In the present example embodiment, the video of the same object under normal conditions that is recorded for monitoring purposes and is stored in the external storage device 200 will be referred to as reference video. Moreover, in the present example embodiment, the still image that is extracted from the reference video under certain specified conditions and is obtained by a prescribed method is referred to as a reference image.

The abnormality detection apparatus 300 compares a target image to be monitored with a reference image, and detects an abnormality from the results of the comparison. When an abnormality is detected, the abnormality detection apparatus 300 generates an alert, and displays a result of comparison between the reference image and the target image to be monitored (i.e., an image that indicates differences) on the monitor 500 or on the display area (for example, a display or screen) of the externally connected device 600. Note that the abnormality detection apparatus 300 may be connected to the network such as the local area network (LAN) or the Internet. Moreover, software that is used to detect an abnormality is installed in the abnormality detection apparatus 300.

The input device 400 is, for example, a keyboard and a mouse, through which a user gives various types of instructions to the abnormality detection apparatus 300. The monitor 500 is, for example, a liquid crystal display (LCD). The monitor 500 displays, for example, the video being recorded by the video 100 connected to the abnormality detection apparatus 300, and/or the video stored in the video data storage unit 350 (see FIG. 2) of the abnormality detection apparatus 300, a still image that is extracted from these two kinds of video, as well as the operation screen of software installed in the abnormality detection apparatus 300.

The externally connected device 600 is, for example, a personal computer (PC), a tablet PC, and a smartphone. The externally connected device 600 is connected to the abnormality detection apparatus 300 through a wired connection such as a LAN cable, by wireless LAN such as wireless fidelity (Wi-Fi), or through a wireless connection such as the Bluetooth (registered trademark). The display specification of the display or screen of the externally connected device 600 is similar to that of the monitor 500.

Figure 2:
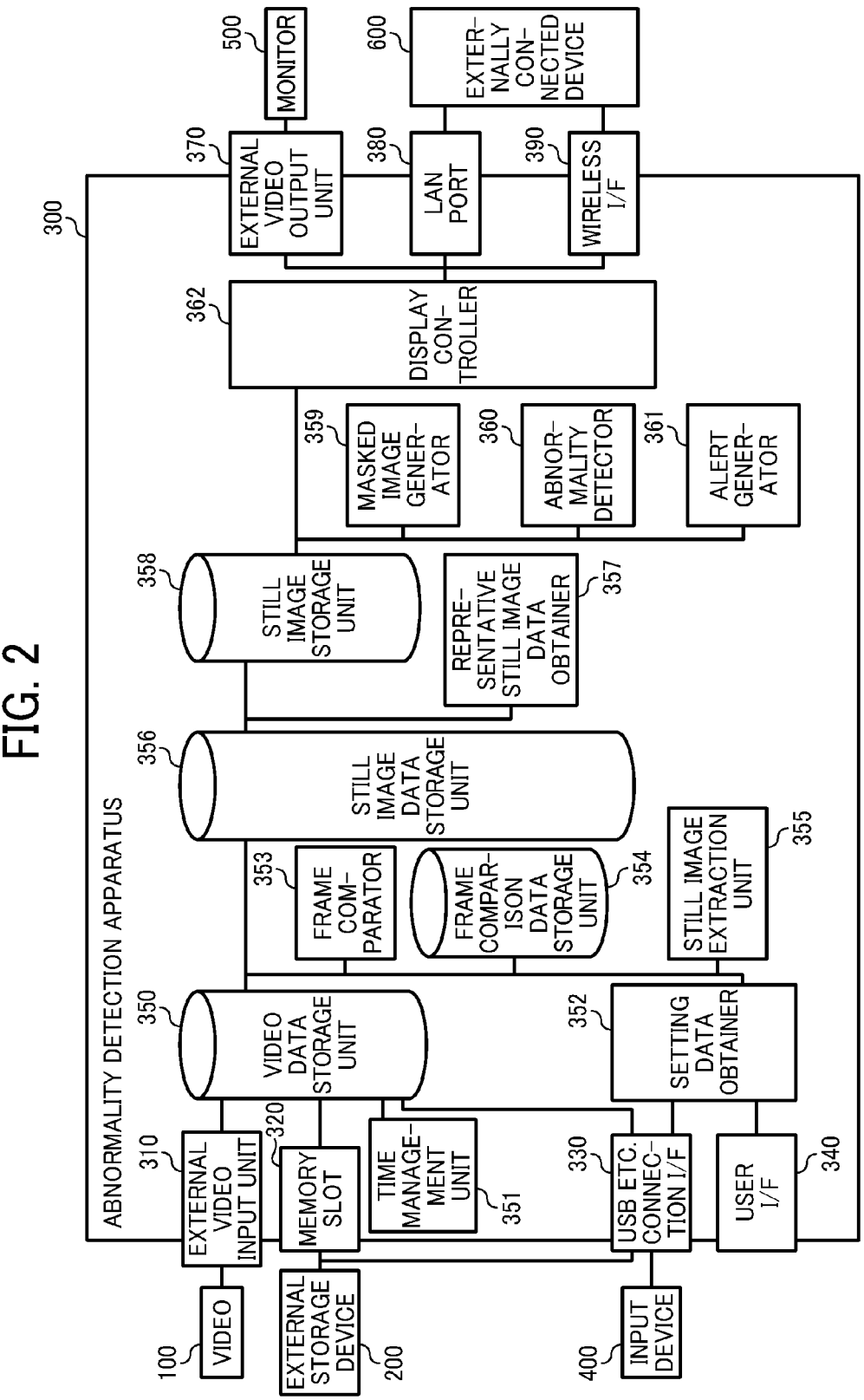
FIG. 2 is a functional block diagram of an abnormality detection apparatus according to an example embodiment of the present invention.

FIG. 2 is a functional block diagram of an abnormality detection apparatus according to an example embodiment of the present invention. The abnormality detection apparatus 300 includes an external video input unit 310, a memory slot 320, a universal serial bus (USB) etc. connection interface 330, a user interface 340, an external video output unit 370, a local area network (LAN) port 380, and a wireless interface 390 that are used to input and output the video data or the like. Moreover, the abnormality detection apparatus 300 includes a video data storage unit 350, a time management unit 351, a setting data obtainer 352, a frame comparator 353, a frame comparison data storage unit 354, a still image extraction unit 355, a still image data storage unit 356, a representative still image data obtainer 357, a still image storage unit 358, a masked image generator 359, an abnormality detector 360, an alert generator 361, and a display controller 362 that are used to detect an abnormality, inside the abnormality detection apparatus 300. Among these elements described above, the time management unit 351, the setting data obtainer 352, the frame comparator 353, the still image extraction unit 355, the representative still image data obtainer 357, the masked image generator 359, the abnormality detector 360, the alert generator 361, and the display controller 362 are implemented by computer programs that are read and executed by a computer (one or more processors) of the abnormality detection apparatus 300.

The external video input unit 310 is an interface that connects between the video 100 and the abnormality detection apparatus 300. The memory slot 320 is a slot into which a memory card storing the video data recorded by videos other than the video 100 is inserted, and transfers the video data.

The USB etc. connection interface 330 is an interface through which the input device 400 such as a keyboard or a mouse is connected to the abnormality detection apparatus 300 using a USB cable, and enables a user to operate the abnormality detection apparatus 300 with the input device 400. Moreover, a user can transfer the video data stored in the external storage device 200 to the abnormality detection apparatus 300 by connecting the external storage device 200 to the USB etc. connection interface 330 using a USB cable. The user interface 340 may be implemented by a touch-panel or various kinds of operation keys, used by a user to directly operate the abnormality detection apparatus 300, and such direct operation includes switching ON/OFF of the power source of the abnormality detection apparatus 300, controlling the storage, selection, and display of still images, and adjusting the volume of alert.

The video data storage unit 350 is a memory provided inside the abnormality detection apparatus 300, and stores the video data recorded by the video 100 and then is input through the external video input unit 310 on a frame-by-frame basis. The video data storage unit 350 also stores the video data transferred from the external storage device 200 through the memory slot 320 or the USB etc. connection interface 330 on a frame-by-frame basis in a similar manner.

The time management unit 351 controls the time inside the abnormality detection apparatus 300 to manage the time data associated with the video data that is recorded by the video 100 and is stored in the abnormality detection apparatus 300, or to manage the time data used for synchronizing the video data. The setting data obtainer 352 obtains data used for detecting an abnormality. For example, when a reference image is compared with a target image to be monitored and an alert is generated based on the result of the comparison (difference), the setting data obtainer 352 obtains as setting data a threshold set by a user for determining whether or not to generate an alert.

The frame comparator 353 reads temporally neighboring frames from the video data stored in the video data storage unit 350 on a frame-on a frame-by-frame basis, and calculates a difference (the amount of change) in pixel value among the temporally neighboring frames for every pixel of the frames. In the present example embodiment, an RGB (red, green, blue) value is referred to when a difference in pixel value is calculated. When comparison is made by referring to an RGB value, firstly, the absolute values of the differences in RGB value (i.e., |r1−r2|, |g1−g2|, and |b1−b2|) are calculated for the pixels of frame 1 (r1, g1, and b1) and frame 2 (r2, g2, and b2) to be compared. Next, the number of the pixels whose calculation results are equal to or greater than a prescribed threshold (in the present example embodiment, such a prescribed threshold will be referred to as a prescribed level of sensitivity) is counted, and the ratio of the counted number of pixels to the total number of the pixels of the corresponding frame is calculated. A method of calculating a difference in pixel value is not necessarily limited to a method in which RGB values of pixels are compared with each other, but a method in which the values of hue saturation value (HSV) of pixels are compared with each other, a method video data (image) is converted into gray scale and the values of brightness of pixels are compared with each other, or a method in which edge detection is performed on video data (image) and the edge strengths of pixels are compared with each other may be used.

The level of sensitivity to determine whether or not a change in RGB value of pixels is significant or a threshold to determine whether or not a change between frames is significant are set by a user. More specifically, the user inputs a level of sensitivity or a threshold on the input screen of the software installed in the abnormality detection apparatus 300. Moreover, the user can adjust the level of sensitivity and the threshold before starting monitoring when still image data is generated from sample video data and the generated still image data is displayed on the monitor 500 or on the display or screen of the externally connected device 600.

The frame comparison data storage unit 354 stores the results of the calculation performed by the frame comparator 353 as frame comparison data. The still image extraction unit 355 specifies a frame interval where changes in pixel value are smaller than the frame comparison data stored in the frame comparison data storage unit 354 (such a frame interval will be referred to as a still image interval in the following description), and extracts still images from the specified still image interval as a set of still images for each still image interval (such a set of still images will be referred to as a group of still images in the following description) and stores the extracted group of still images in the still image data storage unit 356.

The still image data storage unit 356 stores the frame extracted by the still image extraction unit 355, the frame number, and the ratio of the number of the pixels having a level of sensitivity equal to or greater than a prescribed level of sensitivity to the total number of the pixels of the frame in a unit of the group of still images set by the still image extraction unit 355. The still image data that is stored in the still image data storage unit 356 will be described later with reference to FIG. 6.

The representative still image data obtainer 357 obtains, for each group of still images, a still image used for specifying the detail of a still image interval (such a still image will be referred to as a representative still image in the following description) based on the setting (method) obtained by the setting data obtainer 352. The representative still image data obtainer 357 stores the obtained representative still image in the still image storage unit 358 in association with the group of still images.

In order to obtain a representative still image by the representative still image data obtainer 357, the following methods of (i), (ii), and (iii) may be used. The average pixel value (average in RGB value) of the pixels of the still images of a group of still images is calculated, (i) A method in which a representative still image is obtained from the calculated average pixel value. The average pixel value (average in RGB value) of the pixels of the still images of a group of still images is calculated, (ii) A method in which a still image that is extracted by the still image extraction unit 355 at prescribed extracting positions such as first or last extracting positions of a group of still images and is stored in the still image data storage unit 356 is obtained as a representative still image. The average pixel value (average in RGB value) of the pixels of the still images of a group of still images is calculated, (iii) A method in which the frame (still image) whose rate of the number of the pixels with sensitivity equal to or greater than prescribed level of sensitivity to the total number of the pixels of the frames is the smallest is obtained as a representative still image. Although not illustrated in the drawings, a user may obtain a representative still image by displaying prescribed still images stored in the still image data storage unit 356 on the display area of the display 500 or the externally connected device 600 and selecting through the input device 400. The still image storage unit 358 stores the representative still image, which is obtained by the representative still image data obtainer 357, in a unit of a group of still images.

The masked image generator 359 generates a masked image (i.e., an image from which noise is removed by masking the area other than the area of an object to be detected in a frame) by separating the area other than the area of an object to be detected (i.e., a nontarget area) from a representative still image stored in the still image storage unit 358 using the technology of background difference. More specifically, the masked image generator 359 superimposes representative still images stored in the still image storage unit 358 on top of one another, and specifies an area where the difference in pixel value is greater than a prescribed value in the superimposed image (object area to be detected). Then, the masked image generator 359 extracts the areas other than the specified area as nontarget areas. By so doing, a masked image is generated. Once a masked image is generated as above, the masked image generator 359 performs masking processes in which a generated masked image is superimposed on the representative still image. In these processes, an object area to be detected is limited in an image (i.e., a nontarget area is excluded from the image), and noise that may occur in the detection process is removed. Accordingly, the accuracy of detection is improved.

The abnormality detector 360 compares a reference image with a target image to be monitored, and detects an abnormality when it is determined that a prescribed difference is present in the results of the comparison. More specifically, the abnormality detector 360 firstly calculates the differences in pixel value among still images of the reference image and the target image to be monitored for each pixel of the still images (i.e., the absolute value of the difference in RGB value), using the RGB values in a similar manner to the processes of the frame comparator 353. Next, the abnormality detector 360 counts the number of the pixels whose calculation results are equal to or greater than a prescribed level of sensitivity, and calculates the ratio of the counted number of pixels to the total number of the pixels of the still image. Then, the abnormality detector 360 detects an abnormality when the ratio of the number of the pixels having sensitivity equal to or greater than a prescribed level of sensitivity to the total number of the pixels of the frame is equal to or greater than a prescribed threshold. Moreover, the abnormality detector 360 performs the processes of replacing the reference image with a target image to be monitored, for example, when the ratio of the number of the pixels having sensitivity equal to or greater than a prescribed level of sensitivity to the total number of the pixels of the frame smaller than the prescribed threshold, in order to improve the accuracy of the abnormality detection. These processes will be described later in detail with reference to the steps S117 and S119 of FIG. 3 and FIG. 15B. Note that when a difference is calculated between the reference image and the target image to be monitored, the abnormality detector 360 generates a difference image from the calculation result, and stores the generated difference image in the still image storage unit 358.

When an abnormality is detected by the abnormality detector 360, the alert generator 361 generates and outputs an alert. The alert generator 361 may adjust the volume of the alert according to the degree of the abnormality (i.e., the ratio of the number of the pixels having sensitivity equal to or greater than a prescribed level of sensitivity to the total number of the pixels of the frame, which is calculated by the abnormality detector 360 in the above example).

When an abnormality is detected by the abnormality detector 360, the display controller 362 displays the reference image, the target image to be monitored, and or the difference image on the image on the monitor 500 or on the display area of the externally connected device 600. The display controller 362 also displays a still image stored in the still image data storage unit 356, a representative still image stored in the still image data storage unit 358, or the like on the monitor 500 or on the display area of the externally connected device 600 in a similar manner to the above, according to the data input from the input device 400 or the externally connected device 600.

The external video output unit 370 is an interface that connects between the abnormality detection apparatus 300 and the monitor 500. The LAN port 380 is an interface that connects between the abnormality detection apparatus 300 and the externally connected device 600 through a wired connection such as a LAN cable. The wireless interface 390 is an interface that connects between the abnormality detection apparatus 300 and the externally connected device 600 through a wireless connection such as the Wi-Fi and the Bluetooth (registered trademark).

Figure 3A:
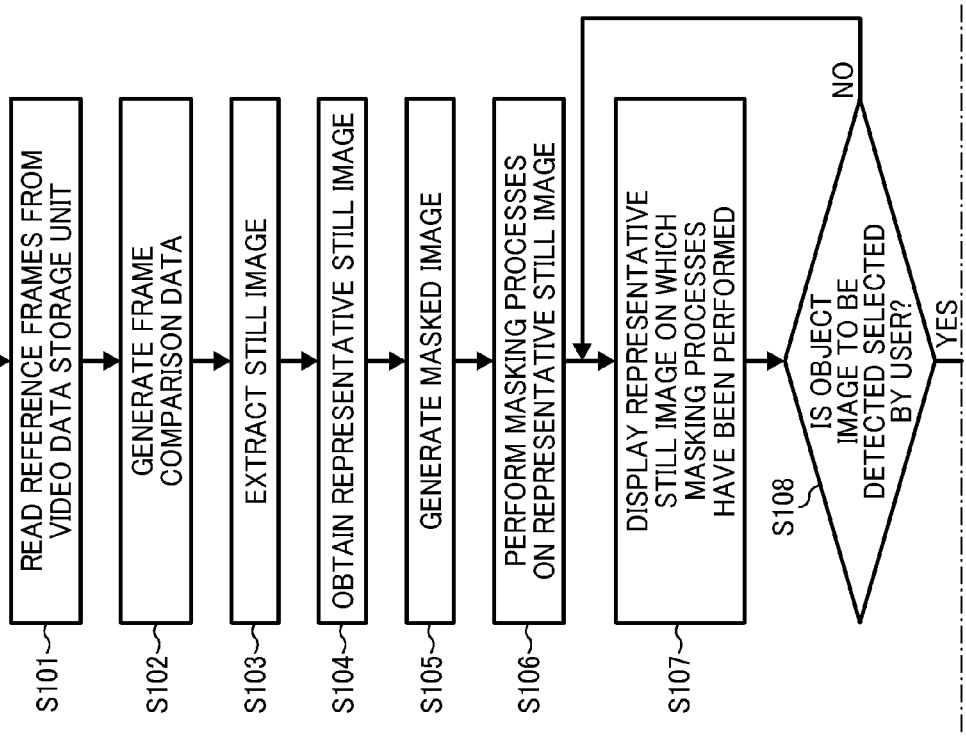
Figure 3B:
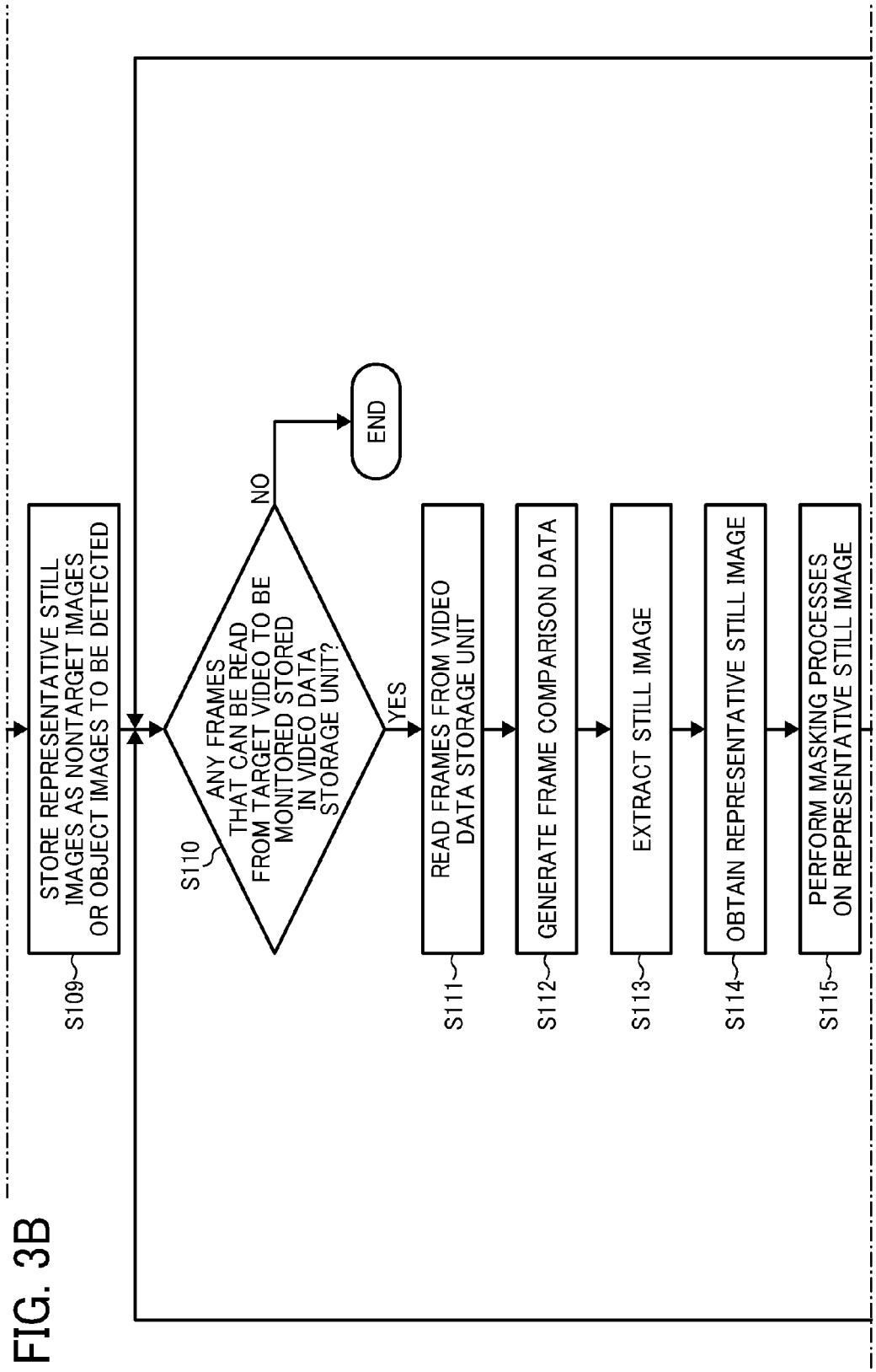

FIG. 3 is a flowchart of the processes performed in the abnormality detection apparatus 300 where reference video is firstly read, and then an abnormality is detected from a target image to be monitored and an alert is generated, according to the present example embodiment of the present invention. These processes include the steps of obtaining reference images from reference video and classifying the obtained reference images into object images to be detected and nontarget images (in the present example embodiment, these steps are referred to as teaching steps (steps S101 to S109)), and the steps of obtaining a target image to be monitored from target video to be monitored, comparing the obtained target image to be monitored with the reference image, and determining whether or not an abnormality is present (in the present example embodiment, these steps are referred to as monitoring steps (steps S110 to S125)). Here, the reference images are classified as object images to be detected and nontarget images in order to improve the practical efficiency of the processes performed by the abnormality detection apparatus 300 when a target image to be monitored is compared with a reference image. In other words, in the monitoring steps, target images to be monitored are firstly compared with nontarget images, and the target images to be monitored that match any of the nontarget images are excluded from the object images to be detected. Then, only the target images to be monitored that do not match any of the nontarget images are compared with the object images to be detected. By so doing, the target images to be monitored that are to be compared with the object images to be detected can be narrowed down in advance.

Next, the processing of the abnormality detection apparatus 300 according to the present example embodiment of the present invention is described with reference to the flowchart of FIG. 3. Firstly, the frame comparator 353 reads temporally neighboring frames from the reference video stored in the video data storage unit 350 (S101). After that, processes are executed in the order of the following description. The frame comparator 353 calculates a difference in pixel value among temporally neighboring frames for every pixel of the frames, and generates a frame comparison data (S102). The generated frame comparison data is stored in the frame comparison data storage unit 354. The frame comparison data will be described later with reference to FIG. 4.

The still image extraction unit 355 specifies a still image interval where differences in pixel value are smaller than a prescribed threshold (6 in FIG. 5) by referring to the frame comparison data stored in the frame comparison data storage unit 354, and extracts frames where differences in pixel value are smaller than a prescribed threshold ($\delta$ in FIG. 5) from the specified still image interval in a unit of a group of still images (S103) and stores the extracted group of still images in the still image data storage unit 356. The specifying processes of still image intervals will be described later with reference to FIG. 5. The still image data that is stored in the still image data storage unit 356 will be described later with reference to FIG. 6, and the still images will be described later with reference to FIG. 9.

The representative still image data obtainer 357 obtains a representative still image from the still image data storage unit 356 for each group of still images (S104). Although not indicated in FIG. 3, the abnormality detection apparatus 300 repeats performing the processes in steps S101 to S104 as long as a frame can be obtained from the reference video. The processes in steps S101 to S104 will be described later in detail with reference to the flowchart of FIG. 7, and the FIG. 8 to FIG. 10.

The masked image generator 359 superimposes all the representative still images on top of one another to specify an object area to be detected, and separate the other areas (nontarget areas). By so doing, a masked image is generated (S105). The generation of a masked image will be described later with reference to FIG. 11.

The masked image generator 359 performs masking processes in which a generated masked image is superimposed on the representative still image (S106). The execution of the masking processes will be described later with reference to FIG. 12. The processes of generating a masked image in step S105 and the masking processes in step S106 are performed in order to improve the accuracy of abnormality detection, and thus are not essential and may be omitted.

The display controller 362 displays a representative still image on which masking processes have been performed on the monitor 500 or on the display area of the externally connected device 600 (S107). In other words, the display controller 362 displays a representative still image on which masking processes have been performed on the monitor 500 or on the display area of the externally connected device 600 until a user selects an object image to be detected (an image used for the detection specified by the user) ("NO" in S108). Once an object image to be detected is selected by a user ("YES" in S108), the abnormality detection apparatus 300 classifies the representative still images on which masking processes have been performed into nontarget images and object images to be detected, and stores the classified images in the still image storage unit 358 (S109). Note that the processes in steps S107 to S109 may be omitted. In such cases, the abnormality detection apparatus 300 classifies all the representative still images on which masking processes have been performed into object images to be detected, and executes the following processes. The processes in which a user selects an object image to be detected (i.e., the processes in step S108) will be described later with reference to FIG. 13.

After the teaching steps in steps S101 to S109 are completed as above, the process shifts to the monitoring steps in steps S110 to S125. In the monitoring steps, firstly, the frame comparator 353 determines whether or not there are frames that can be read from the target video to be monitored stored in the video data storage unit 350 (S110). When it is determined that frames can be read ("YES" in S110), the frame comparator 353 reads temporally neighboring frames (S111). The frame comparator 353 calculates a difference in pixel value among temporally neighboring frames for every pixel of the frames, and generates a frame comparison data (S112). In a similar manner to the processes in step S102, the generated frame comparison data is stored in the frame comparison data storage unit 354.

The still image extraction unit 355 refers to the frame comparison data obtained from the frame comparison data storage unit 354, and specifies a still image interval. Then, the still image extraction unit 355 extracts a frame where a difference in pixel value is smaller than a prescribed threshold ($\epsilon$ in FIG. 5) from the specified still image interval as a still image (S113), and stores the extracted still image in the still image data storage unit 356. The representative still image data obtainer 357 obtains a representative still image from the specified still image interval, based on, for example, the methods of obtaining a representative still image described above (S114).

The masked image generator 359 performs masking processes in which the masked image generated in step S105 is superimposed on the representative still image obtained in step S114 (S115). Note that when the steps S105 and S106 are omitted, the processes in step S115 may also be omitted in a similar manner.

Next, the abnormality detector 360 compares a target image to be monitored for which masking processes have been performed after obtained from the target image to be monitored, with a reference image stored as a nontarget image in step S109, for which masking processes have been performed (S116). More specifically, the abnormality detector 360 calculates a differences in pixel value between the target image to be monitored, which is obtained from the target video to be monitored and on which masking processes have been performed, and the reference images, which have been classified as nontarget images in the teaching steps and on which masking processes have been performed, for each pixel of the still images. Next, the abnormality detector 360 counts the number of the pixels whose calculation results are equal to or greater than a prescribed level of sensitivity, and calculates the ratio of the counted number of pixels to the total number of the pixels of the still image. Then, the abnormality detector 360 determines whether or not the ratio of the number of the pixels having sensitivity equal to or greater than a prescribed level of sensitivity to the total number of the pixels of the frame is equal to or greater than a prescribed threshold $\alpha$ (S116).

When it is determined that the ratio is less than the threshold $\alpha$ ("less than $\alpha$" in S116), the abnormality detector 360 excludes the reference image from the reference images, and replaces the reference image on which masking processes have been performed with the target image to be monitored (S117). Upon performing such replacement, the processes in step S110 and the following steps are performed again (the process ends when no frame can be read from the target video to be monitored stored in the video data storage unit ("NO" in S110)). In such cases, the reference image, which has been classified as a nontarget image and on which the masking processes have been performed in the teaching steps, may be deleted from the still image storage unit 358, or may be stored in a different storage area of the still image storage unit 358. Note that the number of the reference images that have been classified as nontarget images in the teaching steps is not always one. For this reason, the abnormality detector 360 performs the processes in step S116 on each of the reference images, and when the ratio of one of the reference images is determined to be smaller than the threshold $\alpha$ ("smaller than $\alpha$" in S116), the process shifts to step S117 (replacing processes). The processes in steps S116 and S117 will be described later with reference to FIG. 14, FIG. 15A, and FIG. 15B.

The processes of replacing the reference image on which masking processes have been performed with the target image to be monitored (S117) are performed to adopt an image that is captured later than the reference image as a new reference image under the assumption that there is no significant difference between the target image to be monitored and the reference image, i.e., to replace the reference image on which masking processes have been performed with a newly captured image. Such processes are performed to improve the accuracy of abnormality detection, predicting that, for example, the brightness of an object that is captured by the video 100 will vary due to the influence of the sunlight or the like as the time passes. In other words, the replacing processes in step S117 may be omitted when it is guaranteed that the same object is captured and the brightness of the object image or the like does not change as the time passes.

When it is determined that the ratio is equal to or greater than the threshold $\alpha$ ("equal to or greater than $\alpha$" in S116), the abnormality detector 360 of the abnormality detection apparatus 300 compares a target image to be monitored on which masking processes have been performed, with the reference image stored as an object image to be detected in step S109, on which masking processes have been performed (S118). More specifically, the abnormality detector 360 calculates a differences in pixel value between the target image to be monitored on which masking processes have been performed, and the reference images, which have been classified as target images to be monitored and on which masking processes have been performed, for each pixel of the still images. Next, the number of the pixels whose calculation results are equal to or greater than a prescribed level of sensitivity is counted, and the ratio of the counted number of pixels to the total number of the pixels of the still image is calculated. Then, the abnormality detector 360 determines whether or not the ratio of the number of the pixels having sensitivity equal to or greater than a prescribed level of sensitivity to the total number of the pixels of the frame is smaller than a threshold $\beta$, equal to or greater than the threshold $\beta$ but smaller than a threshold $\gamma$, or equal to or greater than the threshold $\gamma$ (S118). In the present example embodiment, an abnormality is detected and alert is generated and output when the ratio is equal to or greater than the threshold $\beta$ but smaller than the threshold $\gamma$. When the ratio is equal to or greater than the threshold $\gamma$, no abnormality is detected but a different kind of factor is sought for.

When it is determined that the ratio is smaller than the threshold $\beta$ ("smaller than $\beta$" in S118), the abnormality detector 360 replaces the reference image, which has been classified as a target image and on which the masking processes have been performed, with the target image to be monitored on which masking processes have been performed (S119) in the still image storage unit 358, and starts the processes from step S110 again. In such cases, the abnormality detection apparatus 300 may delete the reference image, which has been classified as an object image to be detected and on which the masking processes have been performed, from the still image storage unit 358, or may store the reference image, which has been classified as an object image to be detected and on which the masking processes have been performed, in a different storage area of the still image storage unit 358. As described above, the number of the reference images that have been classified as object images to be detected is not always one. For this reason, the abnormality detector 360 performs the processes in step S118 on each of the reference images. When the ratio of one of the reference images is determined to be smaller than the threshold β ("smaller than β" in S118), the process shifts to step S119 (replacing processes). The processes in step S119 are performed in order to improve the accuracy of abnormality detection, and thus may be omitted in a similar manner to the processes in step S117.

When it is determined in step S118 that the ratio of none of the reference images is smaller than the threshold β (i.e., normal) and the ratio of any one of the reference images is equal to or greater than the threshold β but smaller than the threshold γ ("equal to or greater than β but smaller than γ" in S118), i.e., when an abnormality detection is detected by the abnormality detector 360, the alert generator 361 generates and outputs an alert (S120). The alert generator 361 may control the externally connected device 600, which is connected through a wired or wireless connection, to generate and output an alert when an abnormality is detected.

When an alert is generated by the alert generator 361 (S120), the display controller 362 generates an image that indicates differences between the reference image and the target image to be monitored, and displays the image on the monitor 500 or on the display area of the externally connected device 600 (S121). As described above, the number of the reference images that have been classified as object images to be detected is not always one. For this reason, the abnormality detector 360 performs the processes in step S118 on each of the reference images, and shifts the process to step S120 (generating and outputting an alert) when the ratio of one of the reference images is determined to be equal to or greater than the threshold β but smaller than the threshold γ.

The display controller 362 displays the difference as an image, and asks a user to decide whether or not to continue the monitoring (S122) when the user confirms the details of the error. More specifically, the display controller 362 displays a message asking whether or not to continue the monitoring on the monitor 500 or on the display area of the externally connected device 600. When the user decides to continue the monitoring ("YES" in S122), the abnormality detection apparatus 300 starts the processes from step S110 again. When the user decides to end the monitoring, the abnormality detection apparatus 300 terminates the monitoring. The processes performed when the difference is equal to or greater than the threshold α in step S116, the processes performed when the ratio is equal to or greater than the threshold β but smaller than the threshold γ in step S118, and the processes in steps S121 and S122 will be described later in detail with reference to FIG. 17A, FIG. 17B, and FIG. 17C.

When it is determined in step S118 that the ratio of none of the reference images is smaller than the threshold β and the ratio is not equal to or greater than the threshold β but smaller than the threshold γ (i.e., when the ratio is equal to or greater than the threshold γ ("equal to or greater than γ" in S118), the display controller 362 displays the reference image and the target image to be monitored on the image on the monitor 500 or on the display area of the externally connected device 600 (S123). In step S123, the display controller 362 displays the reference image and the target image to be monitored on the image on the monitor 500 or on the display area of the externally connected device 600, and asks the user whether or not to add (set) the displayed target image to be monitored as a nontarget image of the reference images.

When the user decides to add the displayed target image to be monitored as a nontarget image of the reference images ("YES" in S124), the abnormality detector 360 adds the displayed target image to be monitored as a nontarget image of the reference images in the still image storage unit 358 (S125). After that, the processes in step S110 and the following steps are performed again. In a similar manner, when the user decides not to add the displayed target image to be monitored as a nontarget image of the reference images ("NO" in S124), the processes in step S110 and the following steps are performed again. The processes performed when the difference is equal to or greater than the threshold α in step S116, the processes performed when the ratio is equal to or greater than the threshold γ in step S118, and the processes in steps S123 and S125 will be described later in detail with reference to FIG. 19A, FIG. 19B, FIG. 19C, and FIG. 19D.

Next, the processes of specifying a still image interval in the video data, the processes of extracting still images from the specified still image interval as a group of still images, and the processes of obtaining a representative still image from the extracted still images are described in detail with reference to FIG. 4, FIG. 5, FIG. 6, and FIG. 7. The drawings of FIG. 4, FIG. 5, FIG. 6, and FIG. 7 relate to the steps S101 to S104 and the steps S111 to S114 of FIG. 3.

FIG. 4 is the frame comparison data stored in the frame comparison data storage unit 354 according to the present example embodiment. In FIG. 4, the left field indicates the frame number (the order of the frames that are read from the video data at prescribed time intervals), and the right field indicates the ratio (percentage) of the number of the pixels having a level of sensitivity equal to or greater than a prescribed level of sensitivity to the total number of the pixels of the frame. For example, the row of frame number 11 indicates that the absolute value of a difference in RGB value is calculated for each pixel of the frame in comparison to the frame of frame number 10 and the ratio of the number of the pixels having sensitivity equal to or greater than a prescribed level of sensitivity determined by the calculation result to the total number of the pixels of the frame is 85 percent. In a similar manner, the row of frame number 12 indicates that, in comparison to the frame of frame number 11, the ratio of the number of the pixels having sensitivity equal to or greater than a prescribed level of sensitivity to the total number of the pixels of the frame is 6 percent. The same applies to the rows of frame number 13 and the following frame numbers.

Figure 5:
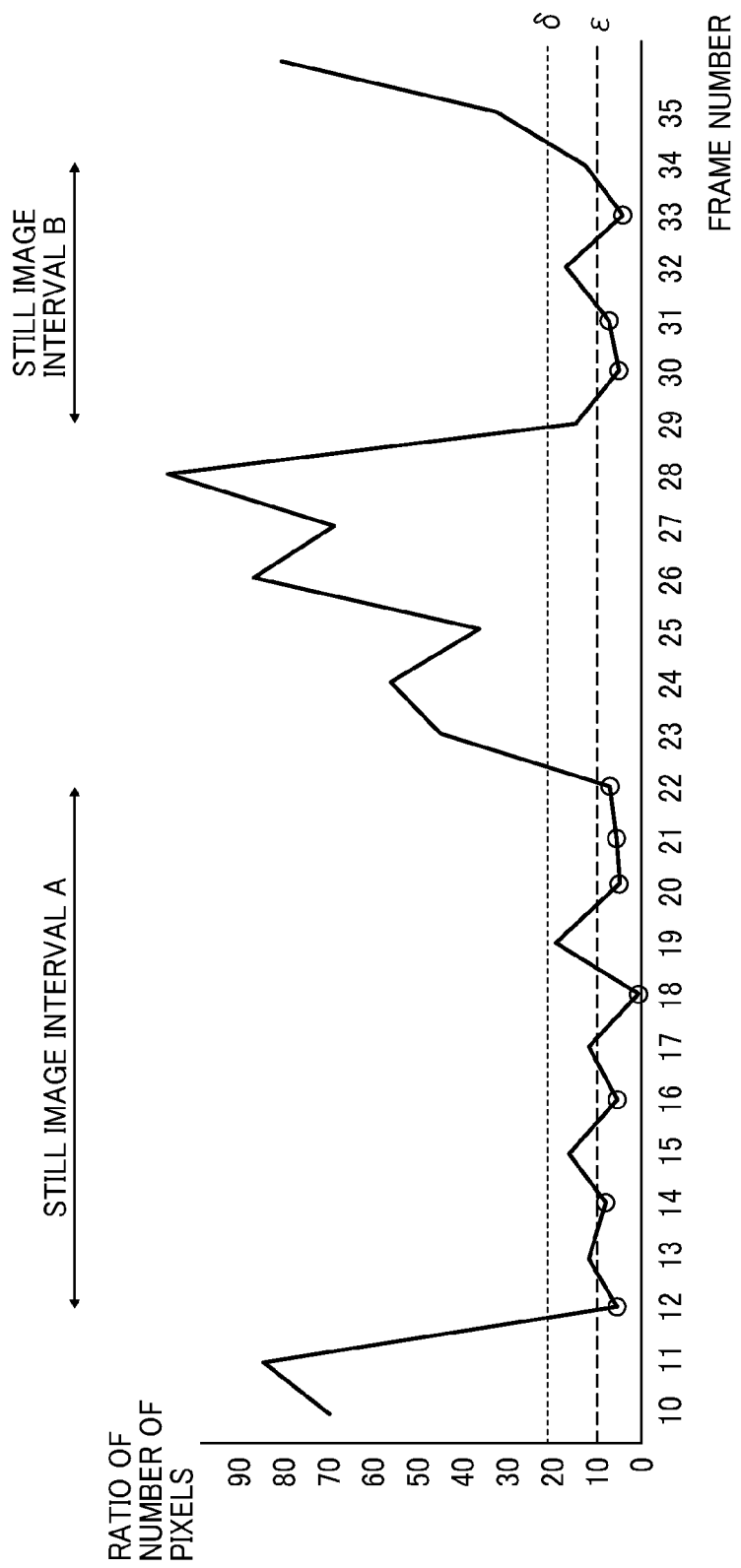
FIG. 5 is a graph of frame comparison data according to an example embodiment of the present invention.

Next, the specifying processes of still image intervals and the extracting processes of still images, which are performed by the still image extraction unit 355, are described with reference to FIG. 5. FIG. 5 is a graph of the frame comparison data stored in the frame comparison data storage unit 354 illustrated in FIG. 4. In FIG. 5, the horizontal axis indicates the frame number, and the vertical axis indicates the ratio of the number of the pixels having a level of sensitivity equal to or greater than a prescribed level of sensitivity to the total number of the pixels of the frame. In FIG. 5, the time intervals in which frames are read are illustrated in a time span longer than the actual time span for the sake of explanatory convenience.

Referring to FIG. 5, in the frame intervals of frame numbers 12 to 22 and frame numbers 29 to 34, the ratio of the number of the pixels having a level of sensitivity equal to or greater than a prescribed level of sensitivity to the total number of the pixels of the frame is relatively low. In this example, the ratio of the number of the pixels having a level of sensitivity equal to or greater than a prescribed level of sensitivity to the total number of the pixels of the frame fluctuates widely in the frame interval of frame numbers 23 to 28, between the still images extracted from the frame interval of frame numbers 12 to 22 and the still images extracted from the frame interval of frame numbers 29 to 34. Accordingly, it is considered that the still images extracted from the frame interval of frame numbers 12 to 22 and the still images extracted from the frame interval of frame numbers 29 to 34 may be taken in different scenes. In order to extract still images for each different scene, the still image extraction unit 355 specifies a still image interval, and extracts still images from the specified still image interval (in a unit of a group of still images) and stores the extracted group of still images in the still image data storage unit 356.

Next, the processes of the frame comparator 353 and the still image extraction unit 355 are described. The frame comparator 353 successively reads frames from the video data at prescribed time intervals, and calculates the absolute value of a difference in pixel value (RGB value) between temporally neighboring frames. Then, the frame comparator 353 counts the number of the pixels of the latter frame where the calculated absolute value is equal to or greater than a prescribed level of sensitivity. Next, the still image extraction unit 355 specifies the interval from a point where the ratio of the counted number of the pixels of the latter frame to the total number of the pixels of the corresponding frame becomes less than a threshold δ to a point where the ratio becomes equal to or greater than the threshold δ (i.e., an interval where the ratio is less than the threshold δ), as a still image interval. Note that the threshold δ corresponds to a first threshold in the present example embodiment.

Next, the still image extraction unit 355 extracts the still images where the ratio of the number of pixels is smaller than a threshold ε (threshold ε corresponds to a second threshold in the present example embodiment) that is smaller than the threshold δ, from the still images that belong to the specified still image interval (in the present example embodiment, these still images that belong to the specified still image interval are referred to as first still images for the sake of explanatory convenience). Then, the still image extraction unit 355 obtains a still image that specifies the video data in the still image interval based on the extracted second still image, using the obtaining methods described below. More specifically, the still image extraction unit 355 associates the second still images, where the ratio of the number of the pixels having a level of sensitivity equal to or greater than a prescribed level of sensitivity to the total number of the pixels of the frame is smaller than the threshold ε, with a group of still images, and stores the second still images associated with the group of still images in the still image data storage unit 356. The still image interval is not determined until the ratio of the number of the pixels having a level of sensitivity equal to or greater than a prescribed level of sensitivity to the total number of the pixels of the frame becomes equal to or greater than the threshold δ after being smaller than the threshold δ, and it is necessary for the still image extraction unit 355 to read frames in a successive manner to extract a second still image whose ratio of the number of the pixels with sensitivity equal to or greater than the prescribed level of sensitivity is smaller than the threshold ε, and to store the extracted second still image, before specifying the still image interval. For this reason, in the actual processes, the still image extraction unit 355 sequentially extracts frames that satisfy certain specified conditions (second still images) after the start point of the still image interval is specified, and stores the extracted still image in the still image data storage unit 356.

In so doing, in the present example embodiment, a still image group setting flag is used to determine whether or not a group of still images has been set. More specifically, among the temporally neighboring frames, the still image group setting flag is set to "1" when the ratio of the number of the pixels where the absolute value of the difference in pixel value of the frames equal to or greater than a prescribed value (a prescribed level of sensitivity) to the total number of the pixels of the frame becomes smaller than the threshold δ after being equal to or greater than the threshold δ (for example, when the frame number changes from 11 to 12 or when the frame number changes from 28 to 29 in FIG. 5). On the other hand, among the temporally neighboring frames, the still image group setting flag is set to "0" when the ratio of the number of the pixels where the absolute value of the difference in pixel value of the frames equal to or greater than the prescribed level of sensitivity to the total number of the pixels of the frame becomes equal to or greater than the threshold δ after being smaller than the threshold δ (for example, when the frame number changes from 22 to 23 or when the frame number changes from 34 to 35 in FIG. 5). Moreover, the abnormality detection apparatus 300 uses the still image group setting flag to specify a still image interval, in the internal processing. More specifically, the abnormality detection apparatus 300 specifies a frame interval between a point where the still image group setting flag is set to "1" and a point where the still image group setting flag is set to "0" as a still image interval.

In the example graph of FIG. 5, the threshold δ that is used to specify a still image interval (indicated by dotted lines in FIG. 5) is set to 20 percent. Accordingly, in the example graph of FIG. 5, the still image extraction unit 355 specifies the frames of frame numbers 12 to 22 as a still image interval A, and specifies the frames of frame numbers 29 to 34 as a still image interval B. Further, in the present example embodiment, the threshold ε that is used to determine whether the frame corresponds to a second still image (indicated by broken lines in FIG. 5) is set to 10 percent as illustrated in FIG. 5. Accordingly, in the example graph of FIG. 5, the still image extraction unit 355 specifies the frames of frame numbers 12, 14, 16, 18, 20, 21, and 22 extracted in the still image interval A as second still images of the group of still images A, and specifies the frames of frame numbers 30, 31, and 33 extracted in the still image interval B as second still images of the group of still images B. Then, the specified second images are stored in the still image data storage unit 356.

In FIG. 5, the threshold δ that is used to specify a still image interval is set to 20 percent that is higher than the threshold ε of 10 percent by 10 percent. Two levels of thresholds δ and ε are set and the still images are classified into two levels of first still images and second still images for the following reason. Even though it is expected that the frames of the same scene extracted as still images be temporally continuous, there are some cases in which the pixel value varies due to the contamination of video data with noise. Even in such cases, unless the ratio of the number of pixels reaches the threshold δ, the frame that is contaminated with noise can be determined to be the frame of the same scene (in the same still image interval) due to the two-level configuration described above.

FIG. 6 depicts the still image data that is stored in the still image data storage unit 356, according to the present example embodiment. In FIG. 6, the left field, the middle field, and the right field indicate the groups of still images, the frame number, and the ratio of the number of the pixels having a level of sensitivity equal to or greater than a prescribed level of sensitivity to the total number of the pixels of the frame, respectively. The frames (still images) that are extracted by the still image extraction unit 355 will be described later with reference to FIG. 9.

Next, the processes where still image intervals are specified and representative still images are obtained by the abnormality detection apparatus 300 according to the present example embodiment of the present invention are described with reference to the flowchart of FIG. 7. The frame comparator 353 determines whether or not frames can be read from the video data storage unit 350 (S201). More specifically, the frame comparator 353 determines whether or not the video data from which still images (second still images) are to be extracted is stored in the video data storage unit 350.

When it is determined that frames can be read ("YES" in S201), the frame comparator 353 reads temporally neighboring frames (S202). The frame comparator 353 calculates the absolute value of a difference in RGB (red, green, blue) value among the temporally neighboring frames read in step S202, for every pixel of the frames (S203). Next, the frame comparator 353 counts the number of the pixels whose absolute value of a difference in RGB value among the temporally neighboring frames is equal to or greater than a prescribed value of sensitivity, and calculates the ratio of the number of pixels whose absolute value is equal to or greater than the prescribed value of sensitivity to the total number of the pixels of the frames (S204). The results of the calculation performed by the frame comparator 353 (FIG. 4) are stored in the frame comparison data storage unit 354 as calculation results of the latter frame (not depicted in the flowchart of the FIG. 7).

Next, the still image extraction unit 355 determines whether or not the ratio of the number of the pixels with sensitivity equal to or greater than the prescribed level of sensitivity is less than threshold δ that specifies still image intervals, in the frames read in step S201 (S205). When it is determined in the frames read in step S201 that the ratio of the number of the pixels with sensitivity equal to or greater than the prescribed level of sensitivity is less than threshold δ ("YES" in S205), the still image extraction unit 355 determines whether or not a group of still images has been set (S206). More specifically, the still image extraction unit 355 determines whether or not the still image group setting flag that indicates whether any group of still images has been set is set to "1".

In other words, "1" that is set to the still image group setting flag indicates that a group of still images has been set, and "0" that is set to the still image group setting flag indicates that no group of still images has been set. As described above, the still image extraction unit 355 specifies a frame interval between a point where the still image group setting flag is set to "1" and a point where the still image group setting flag is set to "0" as a still image interval.

When it is determined that a group of still images has been set ("YES" in S206), the still image extraction unit 355 then determines whether or not the frames read in step S201 are second still images (S208). More specifically, the still image extraction unit 355 determines whether or not the ratio of the number of the pixels with sensitivity equal to or greater than the prescribed level of sensitivity is less than threshold ε.

When it is determined that a group of still images has not been set ("NO" in S206), the still image extraction unit 355 newly sets a group of still images (S207) and determines whether or not the frames read in step S201 are second still images (S208).

When it is determined that the frames are second still images ("YES" in S208), the frames (second still images) are associated with the group of still images that is set to the frames and are stored in the still image data storage unit 356 (S209).

Next, the abnormality detection apparatus 300 chooses the next frame number (S210), and starts the processes again from step S201. Also when the still image extraction unit 355 determines that the frames read in step S201 are not second still images ("NO" in S208), the abnormality detection apparatus 300 chooses the next frame number (S210), and starts the processes again from step S201, in a similar manner to the above. The processes in these steps S201 to S210 are repeated until the still image extraction unit 355 determines that the ratio of the number of the pixels of the latter frame with sensitivity equal to or greater than the prescribed level of sensitivity is equal to or greater than the threshold δ that specifies still image intervals, in the temporally neighboring frames read in step S201 (i.e., until it is determined that the frame is out of still image interval) ("NO" in S205). Accordingly, the groups of still images that makes up a still image interval is stored in the still image data storage unit 356.

When the still image extraction unit 355 determines in step S205 that the ratio of the number of the pixels of the latter frame with sensitivity equal to or greater than the prescribed level of sensitivity is equal to or greater than the threshold δ that specifies still image intervals, in the readout temporally neighboring frames, the representative still image data obtainer 357 determines whether or not any group of still images has been set (i.e., whether or not the still image group setting flag is set to "1") (S211). When it is determined that a group of still images has been set ("YES" in S211), the representative still image data obtainer 357 determines whether or not still image data is stored in the set group of still images (S212).

When it is determined that still image data is associated and stored in the set group of still images ("YES" in S212), the representative still image data obtainer 357 selects a method of obtaining a representative still image based on the setting obtained by the setting data obtainer (S213). When obtaining method 1 is selected ("obtaining method 1" in S213), the representative still image data obtainer 357 calculates the average pixel value of the pixels on the still image that is associated and stored in the group of still images, and generates a representative still image based on the calculated average pixel value and stores the generated representative still image in the still image storage unit 358 (S214). When obtaining method 2 is selected ("obtaining method 2" in S213), the representative still image data obtainer 357 obtains a still image that is extracted at prescribed extracting positions such as first or last extracting positions and is associated and stored in the group of still images as a representative still image, and stores the obtained representative still image in the still image storage unit 358 (S215). When obtaining method 3 is selected ("obtaining method 3" in S213), the representative still image data obtainer 357 obtains the frame whose rate of the number of the pixels with sensitivity equal to or greater than prescribed level of sensitivity to the total number of the pixels of the frames is the smallest as a representative still image, and stores the obtained representative still image in the still image storage unit 358 (S216).

When the obtained representative still image is stored in the still image storage unit 358 (S214, S215, and S216), the representative still image data obtainer 357 resets the still image group setting flag (i.e., sets the setting flag to "0") (S217). Also when it is determined that no still image data is stored in the set group of still images ("NO" in S212), the representative still image data obtainer 357 resets the still image group setting flag in a similar manner to the above (S217).

Once the representative still image data obtainer 357 resets the still image group setting flag (S217), the abnormality detection apparatus 300 chooses the next frame number (S210), and starts the processes again from step S201. Also when no group of still images has been set (i.e., when the still image group setting flag is set to "0") ("NO" in S211), the abnormality detection apparatus 300 chooses the next frame number (S210), and starts the processes again from step S201, in a similar manner to the above.

The abnormality detection apparatus 300 repeats the above processes until no frame can be read from the video data storage unit 350. When frames can no longer be read from the video data storage unit 350 ("NO" in S201), the abnormality detection apparatus 300 terminates the processes of obtaining a still image.

Next, the processes of steps S101 to S104 of FIG. 3 and the processes of FIG. 7 where still image intervals are specified as and representative still images are obtained by the abnormality detection apparatus 300 (still image extraction unit 355) are described with reference to the sample video (images) of the operation recorded at a factory or the like illustrated in FIG. 8 to FIG. 10. The operation at a factory or the like includes a step of manually setting cylinders in circular-hole storage (step A), a step of replacing manually set cylinders with cylinders with smaller diameter (step B), and a step of manually removing the replaced cylinders from the circular-hole storage (step C). The video is recorded by the video 100 (or by recording devices other than the video 100) in such a manner that three circular holes are aligned in a row.

Figure 8:
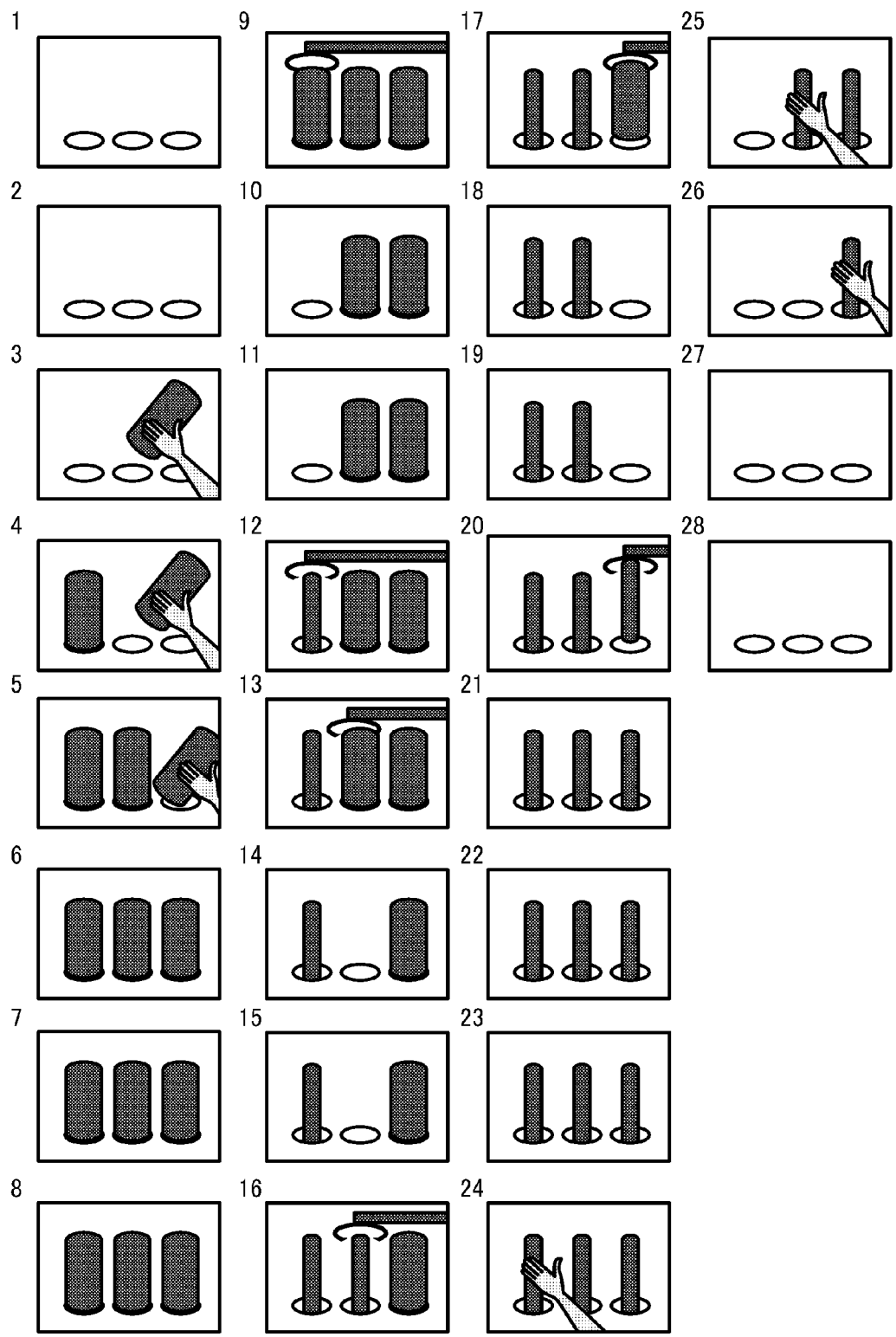
FIG. 8 illustrates the reference video that is stored in a video data storage unit on a frame-by-frame basis, according to an example embodiment of the present invention.

FIG. 8 illustrates the reference video that is stored in the video data storage unit 350 on a frame-by-frame basis, according to an example embodiment of the present invention. In FIG. 8, frame numbers 1 to 8, frame numbers 9 to 23, and frame numbers 24 to 28 correspond to the step A, the step B, and the step C, respectively.

As described above, firstly, the frame comparator 353 reads temporally neighboring frames, i.e., the frames of frame numbers 1 and 2, and calculates a difference in pixel value for every pixel of the frames and stores the calculation result in the frame comparison data storage unit 354. Then, the frame comparator 353 reads the frame of frame number 3, and calculates a difference in pixel value for every pixel of the frames of frame numbers 2 and 3 and stores the calculation result in the frame comparison data storage unit 354, in a similar manner to the above.

Once the frame comparison data is stored in the frame comparison data storage unit 354, the still image extraction unit 355 specifies a still image interval (group of still images) from the frame comparison data, and extracts still images from the specified still image interval as a group of still images and stores the extracted group of still images in the still image data storage unit 356. FIG. 9 illustrates the still images stored in the still image data storage unit 356, according to the present example embodiment. As illustrated in FIG. 9, the still image of frame number 2, the still images of frame numbers 7 and 8, the still image of frame number 11, the still image of frame number 15, the still image of frame number 19, the still images of frame numbers 22 and 23, and the still image of frame number 28 are associated with a group of still images G1, a group of still images G2, a group of still images G3, a group of still images G4, a group of still images G5, a group of still images G6, and a group of still images G7, respectively, as second still images, and are stored in the still image data storage unit 356. As depicted in FIG. 6, the frame numbers and the ratios of the number of the pixels having a level of sensitivity equal to or greater than a prescribed level of sensitivity to the total number of the pixels of the frame are also associated with each of the groups of still images, in addition to the second still images.

Once the still image data is stored in the still image data storage unit 356, the representative still image data obtainer 357 obtains, for each group of still images, a representative still image based on the representative still image obtaining method obtained by the setting data obtainer 352, and stores the obtained representative still image in the still image data storage unit 358. FIG. 10 illustrates the representative still images stored in the still image storage unit 358, according to the present example embodiment. In FIG. 10, the representative still image data obtainer 357 obtains representative still images from the still image data storage unit 356 based on the obtaining method (step S215 of FIG. 7) where the still image that is firstly extracted from a groups of still images is obtained as a representative still image. Accordingly, the still image of frame number 2, the still images of frame number 7, the still image of frame number 11, the still image of frame number 15, the still image of frame number 19, the still images of frame number 22, and the still image of frame number 28 of the group of still images G1, the group of still images G2, the group of still images G3, the group of still images G4, the group of still images G5, the group of still images G6, and the group of still images G7 are stored in the still image storage unit 358 as representative still images. In the following description, the representative still image of the group of still images G1, the representative still image of the group of still images G2, the representative still image of the group of still images G3, the representative still image of the group of still images G4, the representative still image of the group of still images G5, the representative still image of the group of still images G6, and the representative still image of the group of still images G7 may be referred to as M1, M2, M3, M4, M5, M6, and M7, respectively.

Figure 7A:
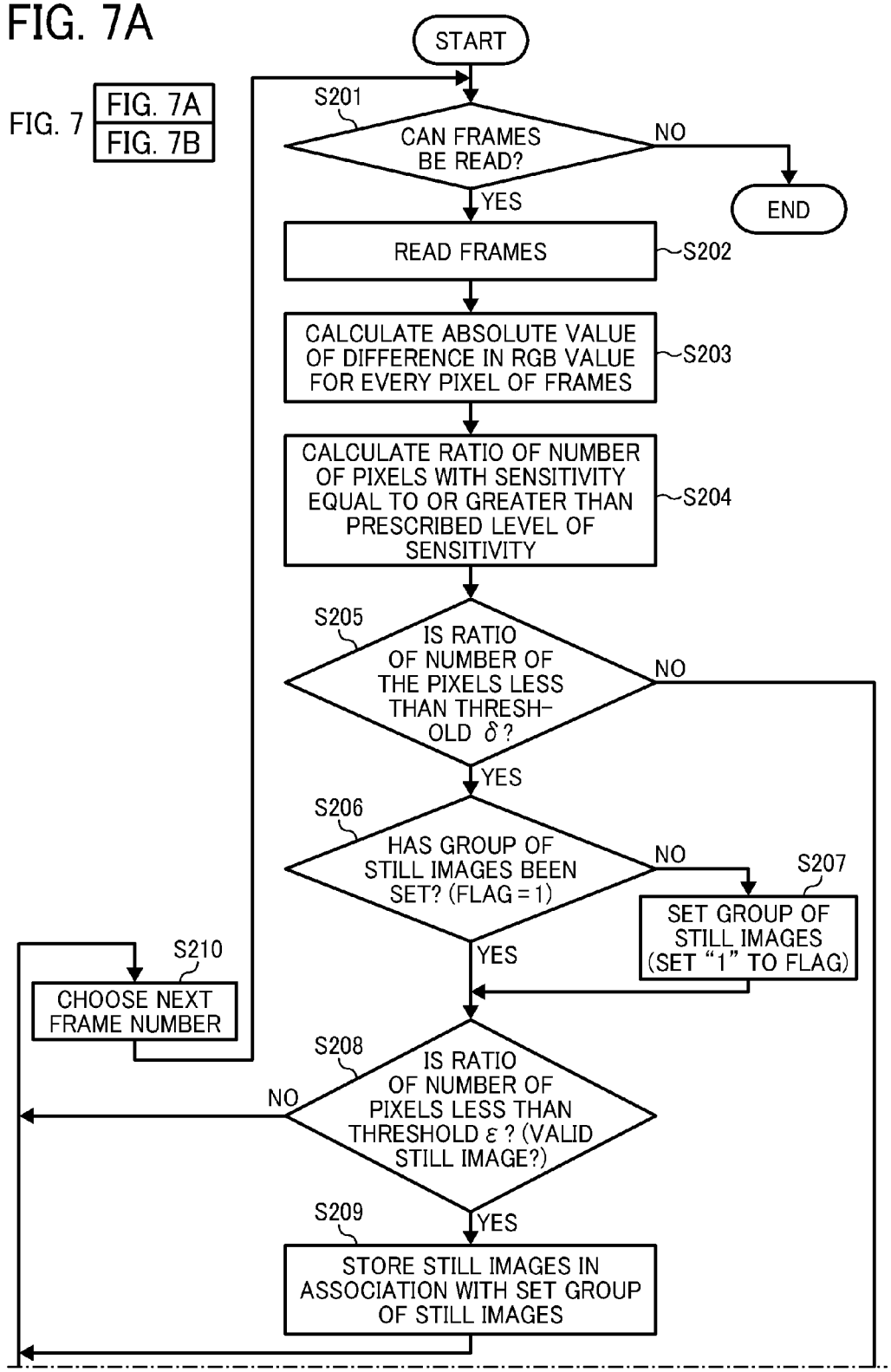
FIG. 7A and FIG. 7B is a flowchart of the processes performed in an abnormality detection apparatus where a still image interval is specified and a representative still image is obtained, according to an example embodiment of the present invention.
Figure 7B:
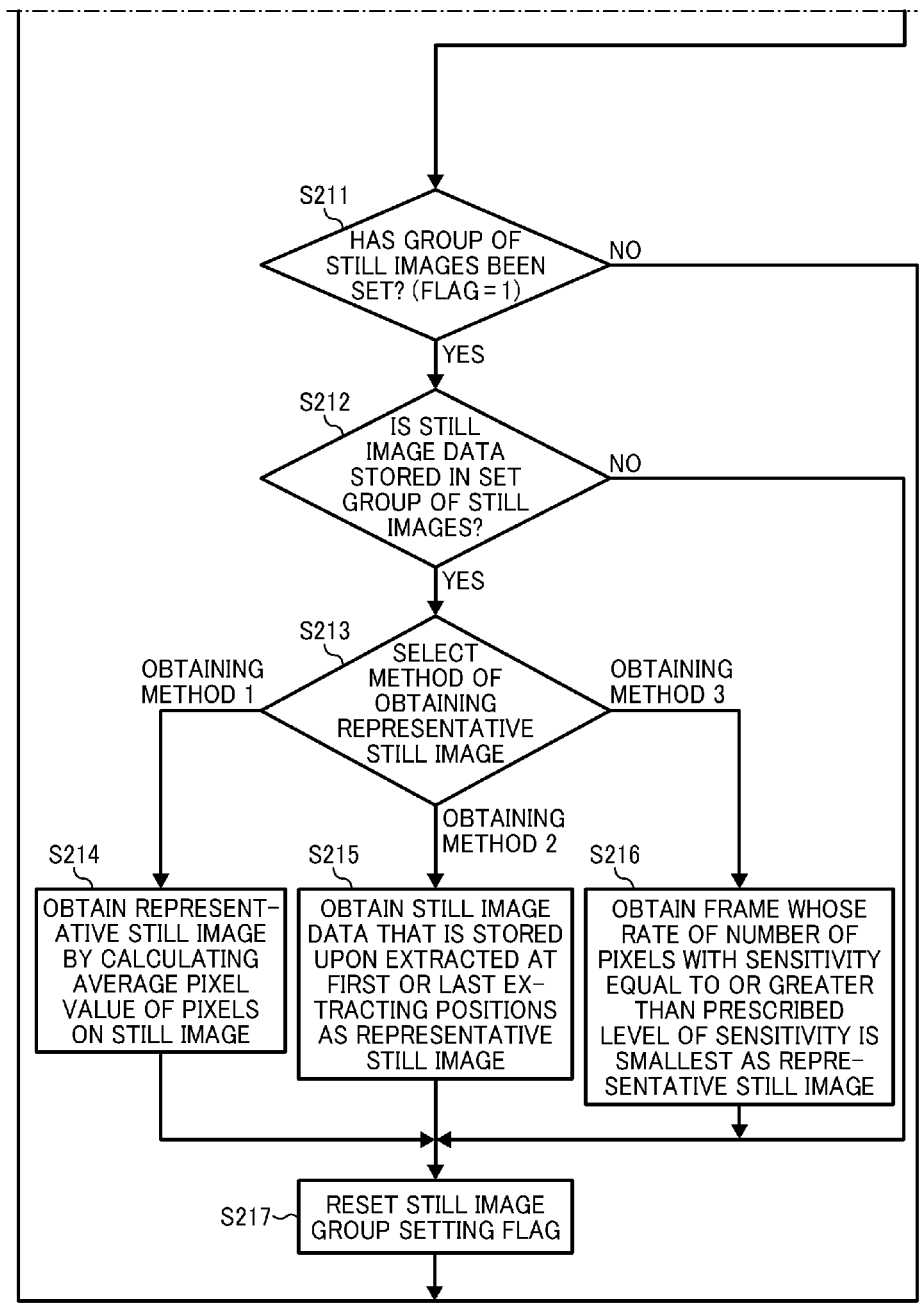
Figure 9:
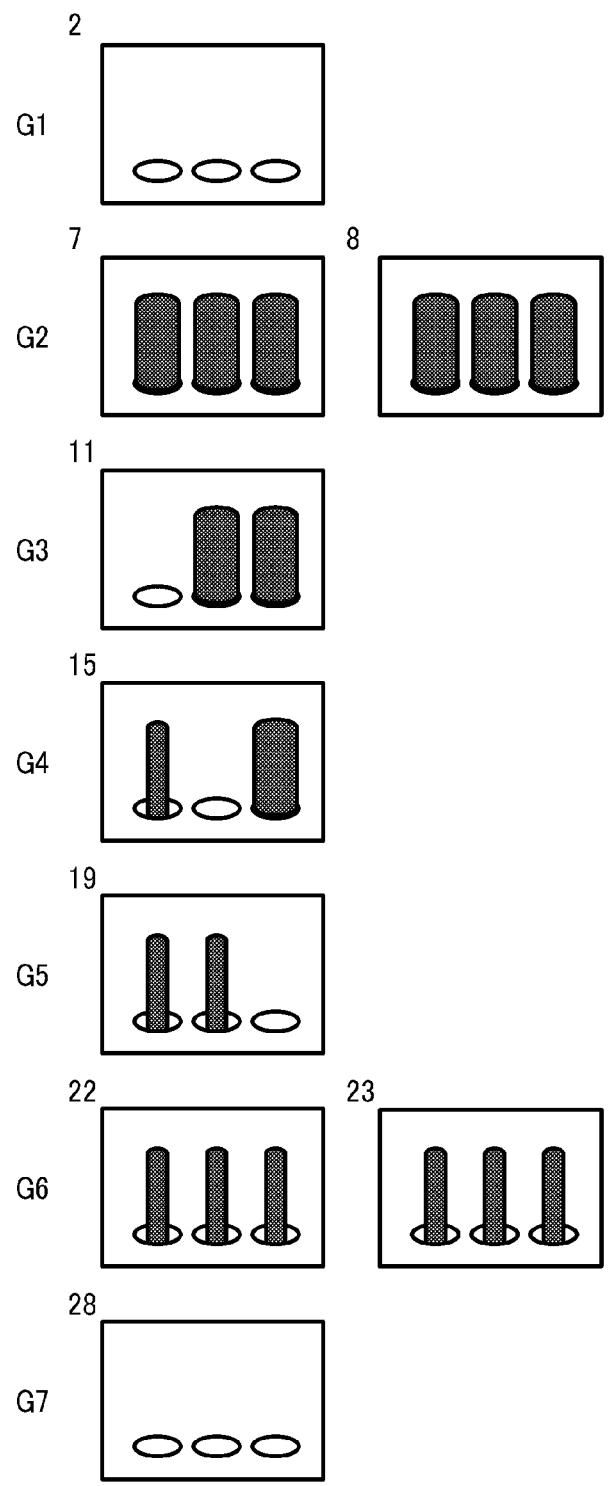
FIG. 9 illustrates the still images stored in a still image data storage unit, according to an example embodiment of the present invention.
Figure 10:
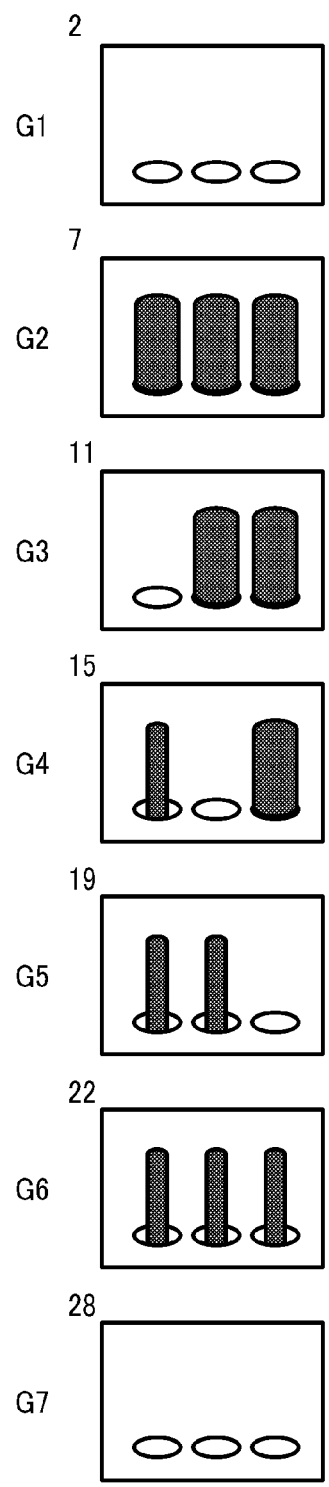
FIG. 10 illustrates the representative still images stored in a still image storage unit, according to an example embodiment of the present invention.

Although FIG. 8 to FIG. 10 are illustrated in accordance with the processes of the abnormality detection apparatus 300 for the sake of explanatory convenience, the actual processes of FIG. 8 to FIG. 10 are consistent with the processes illustrated in FIG. 7. In other words, for example, the abnormality detection apparatus 300 uses the frame comparator 353 to read the frames from the frame of frame number 3, and uses the still image extraction unit 355 to set the still image group setting flag at the frame of frame number 7. When the still image group setting flag is reset at the frame of frame number 9, a still image interval is specified. Accordingly, before the next frame of frame number 10 is read, a representative still image is selected in the specified still image interval and is stored in the still image storage unit 358.

Figure 11:
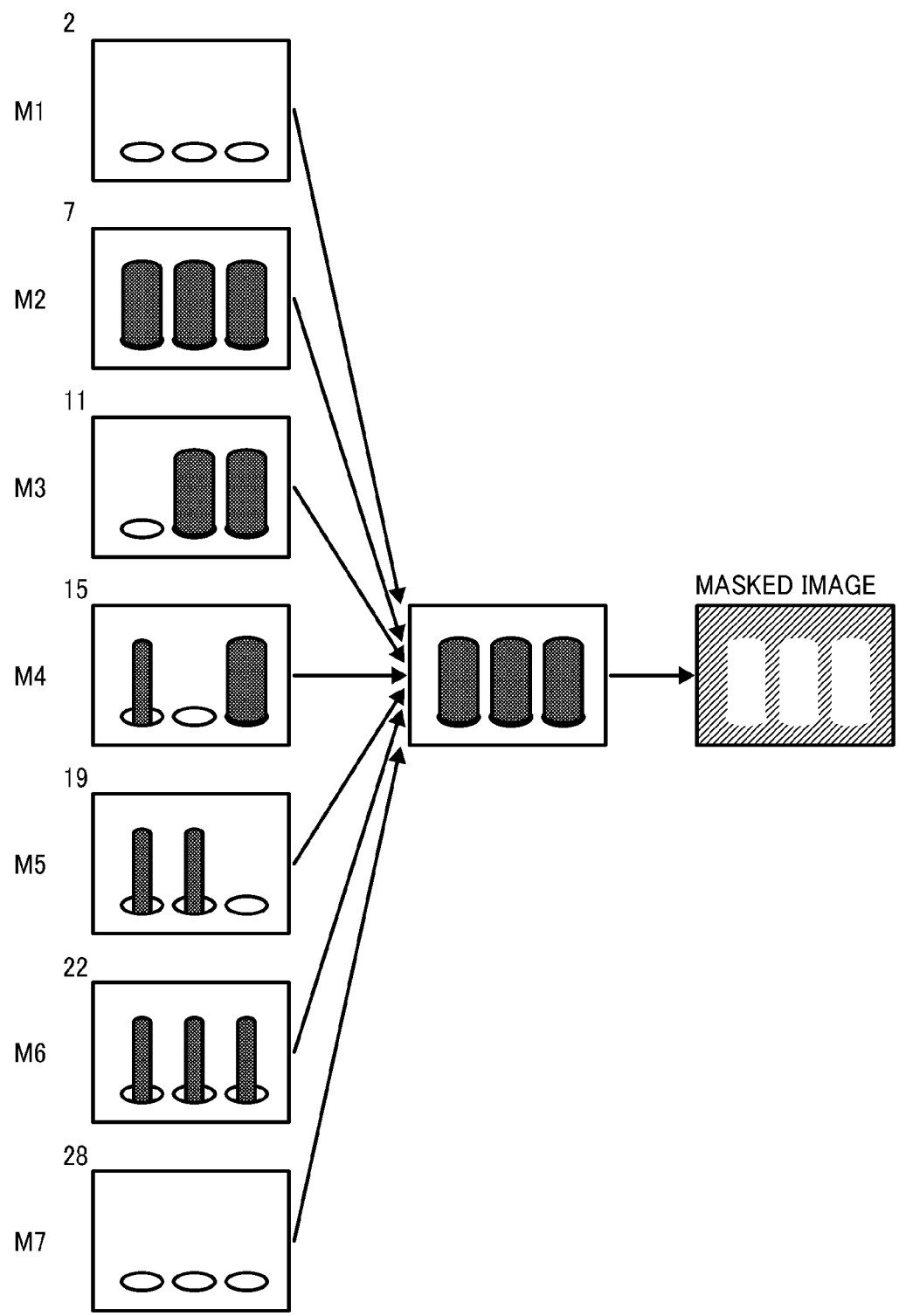
FIG. 11 is a diagram illustrating the generation of a masked image, according to an example embodiment of the present invention.

Once the representative still image data obtainer 357 stores the representative still image in the still image storage unit 358, the masked image generator 359 generates a masked image and superimposes the generated masked image on the representative still image in order to improve the accuracy of the detection. FIG. 11 is a diagram illustrating the generation of a masked image, according to the present example embodiment, and the processes in FIG. 11 correspond to the processes in step S105 of FIG. 3. As illustrated in FIG. 11, the masked image generator 359 superimposes representative still images of M1 to M7 on top of one another, and specifies an area where the difference in pixel value is greater than a prescribed value in the superimposed image. In FIG. 11, cylinders with large diameter are set to the circular-hole storage, and then are replaced with cylinders with smaller diameter and the cylinders with smaller diameter are removed. Accordingly, the area of an image that is occupied by the cylinder with large diameter is specified as an area where the difference in pixel value is large.

Figure 12:
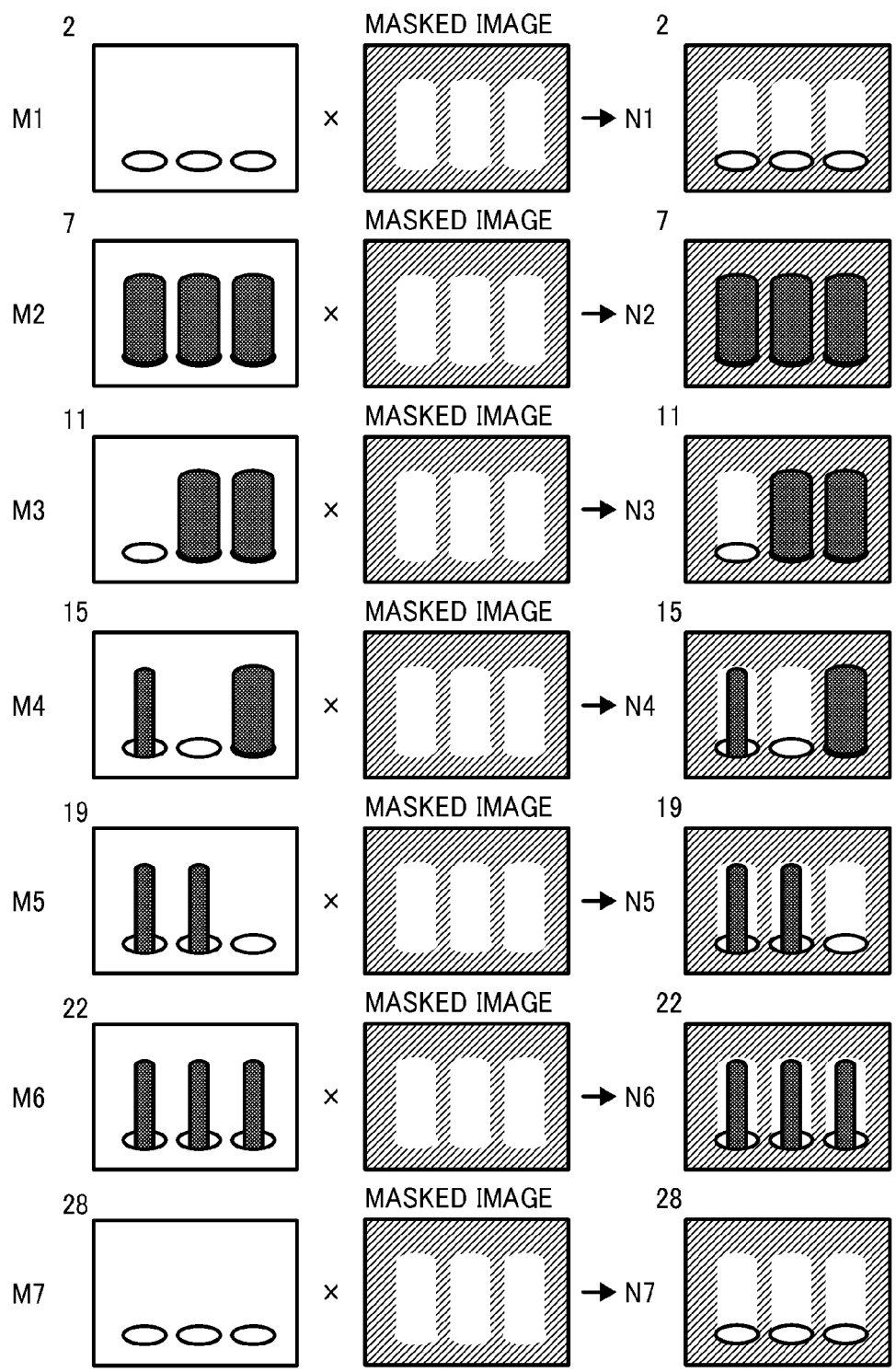
FIG. 12 is a diagram illustrating the masking processes performed by a masked image generator, according to an example embodiment of the present invention.

After the area where the difference in pixel value is large is specified, the masked image generator 359 extracts the areas other than the specified area as nontarget areas, and generates a masked image (hereinafter, such a masked image may be referred to as "Imask"). The masked image generator 359 performs masking processes in which a generated masked image is superimposed on the representative still images of M1 to M7. FIG. 12 is a diagram illustrating the masking processes performed by the masked image generator 359, according to the present example embodiment, and the processes in FIG. 12 correspond to the processes in step S106 of FIG. 3. As illustrated in FIG. 12, the masked image generator 359 performs masking processes in which the masked image Imask is superimposed on the representative still images of M1 to M7. In the following description, the representative still images of M1, M2, M3, M4, M5, M6, and M7 on which the masking processes have been performed may be referred to as representative still images N1, N2, N3, N4, N5, N6, and N7, respectively. The representative still images N1 to N7 on which masking processes have been performed are stored in the still image storage unit 358.

When the representative still images on which masking processes have been performed is stored in the still image storage unit 358, the display controller 362 displays the stored representative still image on the monitor 500 or on the display area of the externally connected device 600. Once an object image to be detected is selected by a user from the representative still images for which masking processes have been performed, the abnormality detection apparatus 300 classifies the representative still images on which masking processes have been performed into nontarget images and object images to be detected, and stores the classified images in the still image storage unit 358. When conditions are set in advance by a user, the object image to be detected may automatically be selected.

Figure 13:
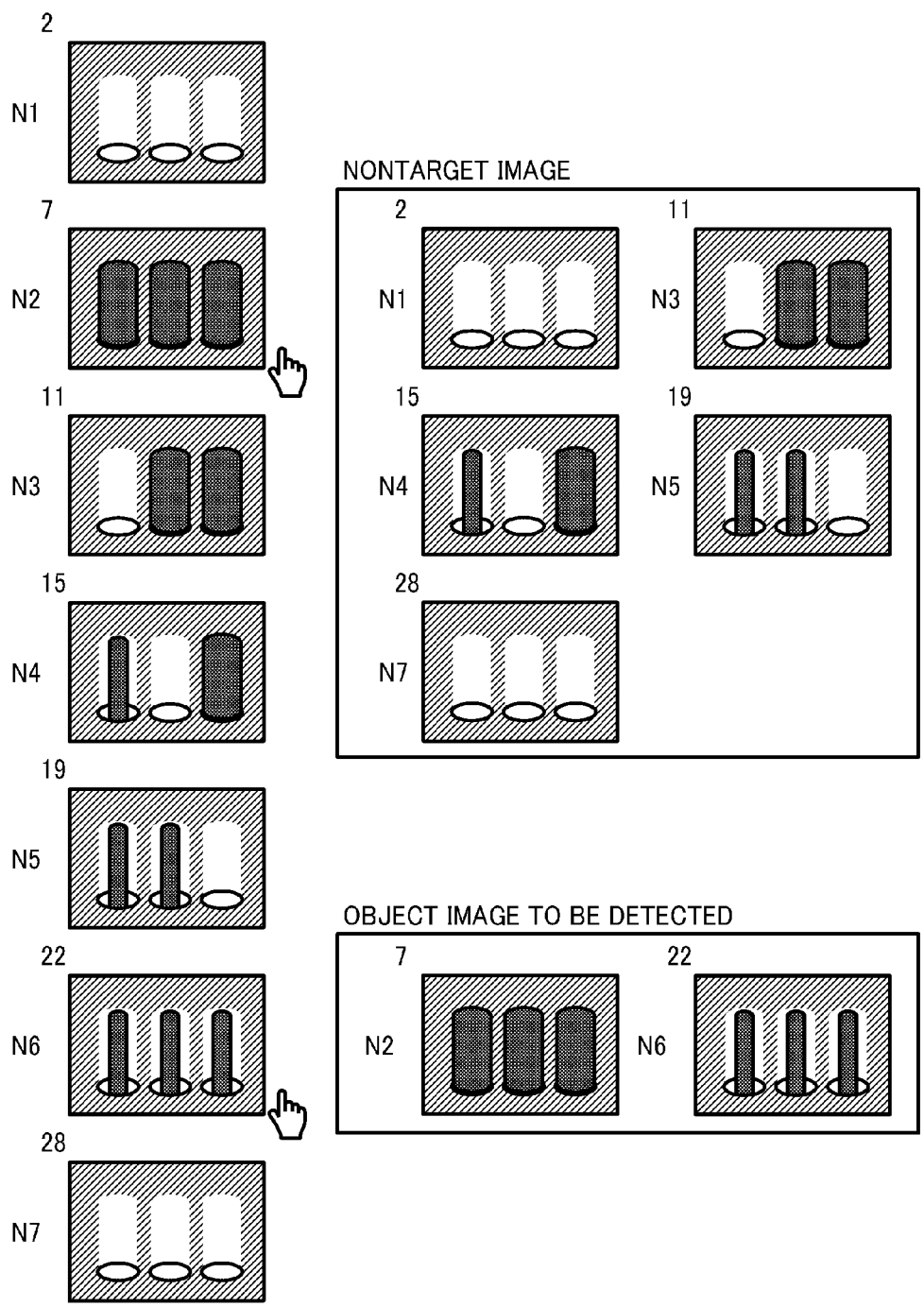
FIG. 13 illustrates the processes of classifying the representative still images on which masking processes have been performed into nontarget images and object images to be detected, according to an example embodiment of the present invention.

FIG. 13 illustrates the processes of classifying the representative still images on which masking processes have been performed into nontarget images and object images to be detected, according to the present example embodiment. In FIG. 13, the representative still images N2 and N6 on which masking processes have been performed are selected by the user as object images to be detected. Accordingly, the representative still images N1, N3, N4, N5, and N7 on which masking processes have been performed are classified as nontarget images, and the representative still images N2 and N6 on which masking processes have been performed are classified as object images to be detected. Then, the representative still images on which masking processes have been performed are stored in the still image storage unit 358. FIG. 13 relates to steps S107 to S109 of the processes of FIG. 3.

Figure 14:
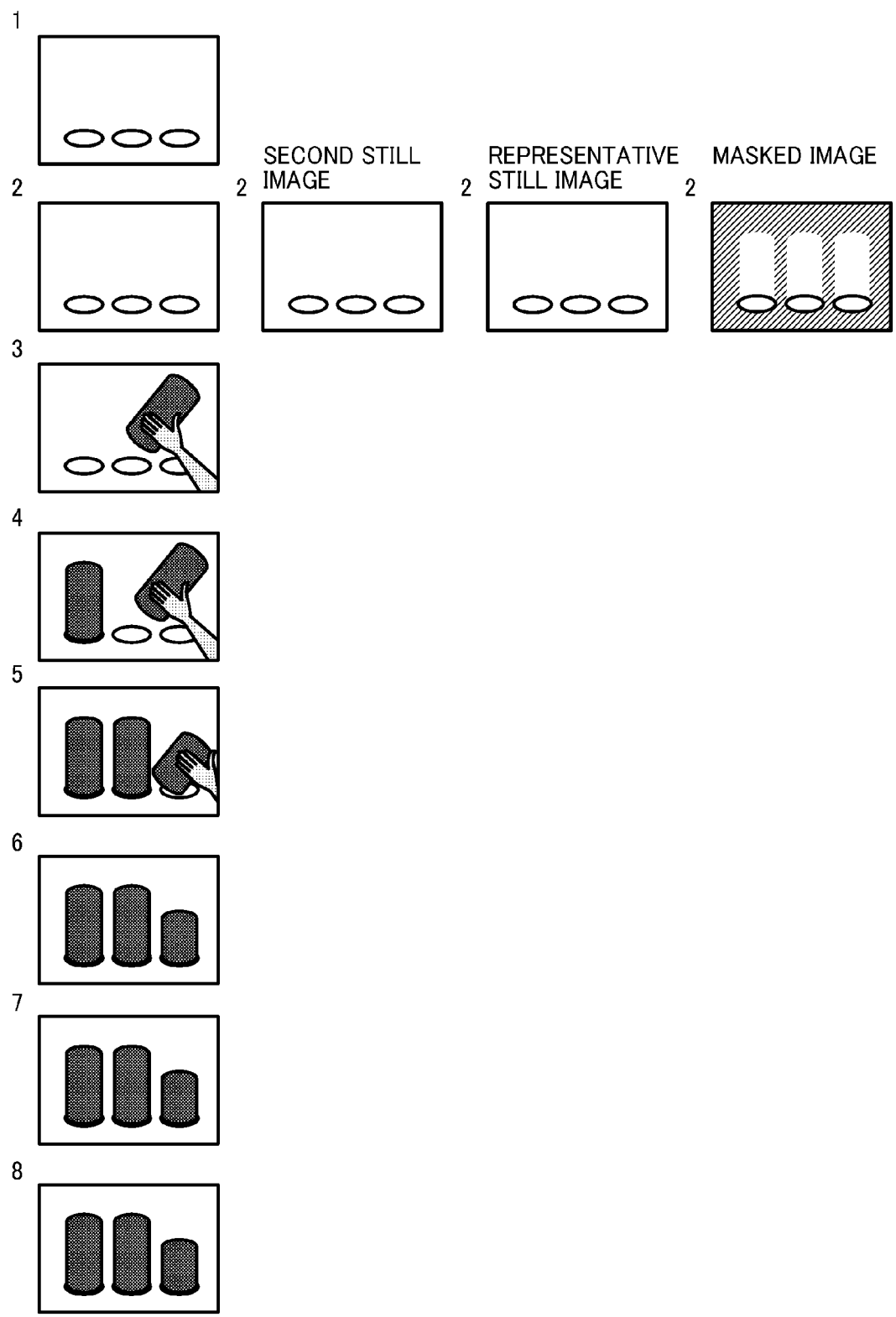
FIG. 14 illustrates the target video to be monitored (frame numbers 1 to 8) that is stored in a video data storage unit on a frame-by-frame basis, according to an example embodiment of the present invention.

As described above, FIG. 8 to FIG. 13 relate to the processes in steps S101 to S109 of FIG. 3, i.e., the teaching steps. Next, the steps of monitoring (steps S110 to S125 of FIG. 3) are described with reference to FIG. 14 to FIG. 19. FIG. 14 illustrates the storing processes of sequentially storing the streaming video provided from the video 100 in the video data storage unit 350 on a frame-by-frame basis, according to the present example embodiment. In FIG. 14 illustrate a state immediately after the operation up to the step A described above is stored in the video data storage unit 350 as target video to be monitored.

In FIG. 14, the frame comparator 353 reads the first frame (frame number 1) and the following frame (frame number 2), and compares the frame of frame number 1 with the frame of frame number 2. However, there is no difference in pixel between the frame of frame number 1 and the frame of frame number 2. Accordingly, the frame comparator 353 extracts the frame of frame number 2 as a still image (S113 in FIG. 3), and stores the extracted still image in the still image data storage unit 356. Next, the frame comparator 353 reads the following frame (frame number 3). As the difference in pixel between the frame of frame number 2 and the frame of frame number 3 is greater than a threshold δ, the frame comparator 353 determines that the frame 2 is a still image and is in a still image interval. Accordingly, the process shifts to the processes of obtaining a representative still image by the representative still image data obtainer 357 ("NO" in S205 of FIG. 7).

The representative still image data obtainer 357 obtains representative still images from the still image data storage unit 356 based on the obtaining method (step S215 of FIG. 7) where the still image that is firstly extracted from a groups of still images is obtained as a representative still image. As only the still image of frame number 2 is associated with the group of still images in FIG. 14, the still image of frame number 2 is obtained as a representative still image (S114 of FIG. 3).

Once the representative still image is obtained by the representative still image data obtainer 357, the masked image generator 359 performs masking processes in which the masked image generated as in FIG. 11 (S105 of FIG. 3) is superimposed on the representative still image. These processes correspond to step S115 of FIG. 3.

Figure 15A:
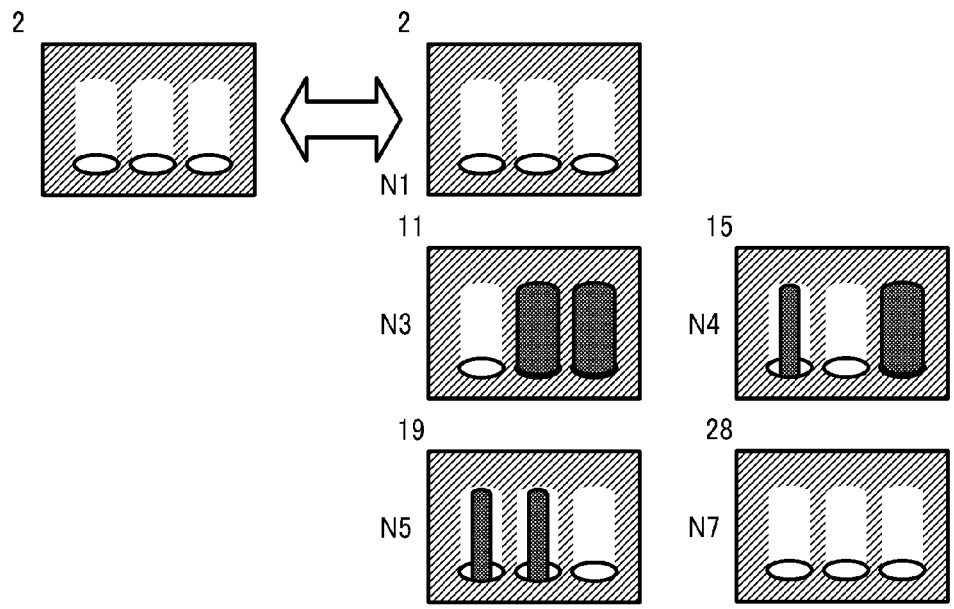
FIG. 15A and FIG. 15B illustrate the processes of comparing a target image to be monitored with a reference image that has been classified as a nontarget image and the accompanying processes that are performed based on the results of the comparison, which are performed by an abnormality detector, according to an example embodiment of the present invention.
Figure 15B:
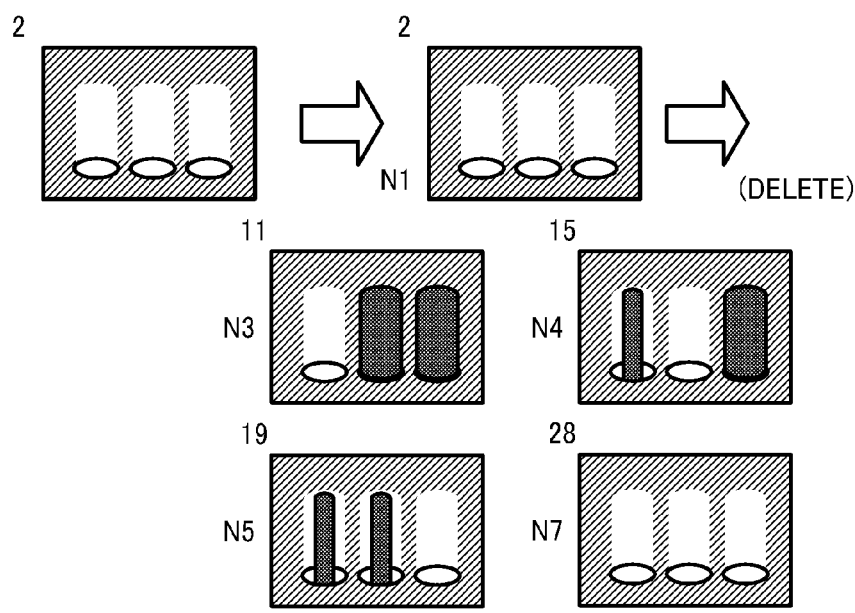

As illustrated in FIG. 14, the abnormality detection apparatus 300 obtains a representative still image (i.e., a target image to be monitored) from the target video to be monitored, and performs masking processes (S110 to S115 of FIG. 3). Next, the abnormality detector 360 compares the target image to be monitored for which masking processes have been performed, with the reference image that has been classified as a nontarget image as in FIG. 13. FIGS. 15A and 15B illustrate the processes of comparing a target image to be monitored with a reference image that has been classified as a nontarget image (FIG. 15A) and the accompanying processes that are performed based on the results of the comparison (FIG. 15B), which are performed by the abnormality detector 360. These processes correspond to steps S116 and S117 of FIG. 3.

The abnormality detector 360 compares the target image to be monitored for which masking processes have been performed, with each of the reference images (frame numbers 2, 11, 15, 19, and 28) that have been classified as nontarget images as in FIG. 13. In FIG. 15A, the abnormality detector 360 determines as a result of the comparison that there is no significant difference between the target image to be monitored for which masking processes have been performed and of the reference image of frame number 2 (i.e., determines that a difference is smaller than a threshold α). Based on this determination, the processes of the abnormality detection apparatus 300 shift to the processes in step S117 of FIG. 3 (FIG. 15B). As illustrated in FIG. 15B, in the still image storage unit 358, the abnormality detector 360 replaces the reference image of frame number 2 that have been classified as a nontarget image with the target image to be monitored (S117 of FIG. 3).

After the frame of frame number 3 is read and the reference image is replaced with the target image to be monitored, in accordance with the flow of FIG. 7, the frame of frame number 4 among the frames of the target video to be monitored illustrated in FIG. 16 is read from the video data storage unit 350, and the read frame of frame number 4 is compared with the frame of frame number 3 and still image data is generated. In this example, the ratio of the number of the pixels having a level of sensitivity equal to or greater than a prescribed level of sensitivity to the total number of the pixels of the frame is equal to or greater than δ in the frame of frame number 4, and thus the frame of frame number 4 is not extracted as a still image. Subsequently, the frame comparator 353 reads the frames of frame numbers 5, 6, 7, 8, and 9, and still image extraction unit 355 specifies a still image interval based on the result of comparison between the frames of frame numbers 8 and 9 and extracts the frames of frame numbers 7 and 8 as still images. Further, the representative still image data obtainer 357 obtains the frame of frame number 7 as a representative still image based on the obtaining method of step S215 in FIG. 7 (S114 of FIG. 3).

Figure 17A:
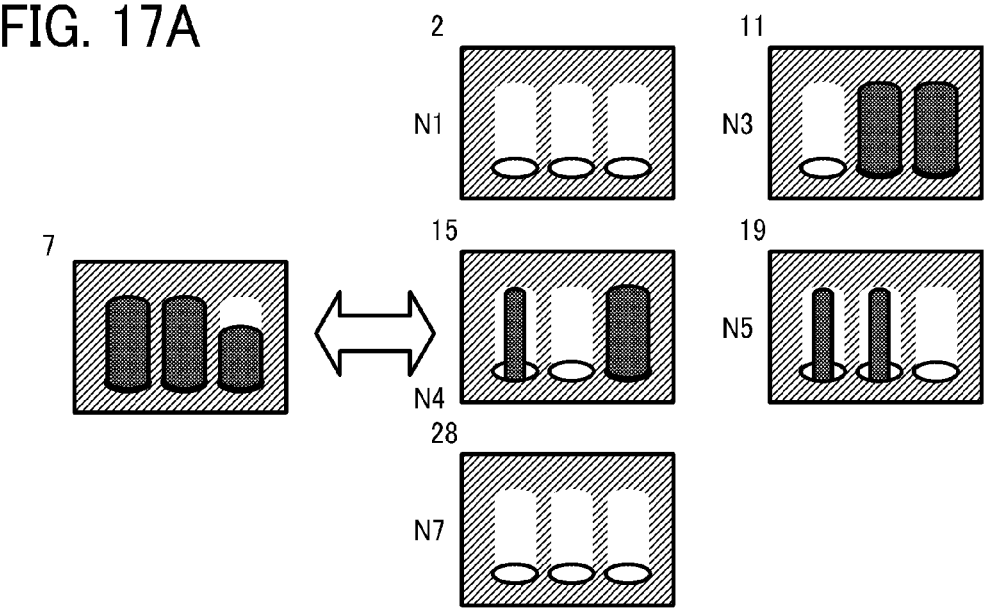
FIG. 17A, FIG. 17B, and FIG. 17C illustrate the processes of comparing a target image to be monitored with a reference image that has been classified as a nontarget image and an object image to be detected and the accompanying processes that are performed based on the results of the comparison, which are performed by an abnormality detector, according to an example embodiment of the present invention.
Figure 17B:
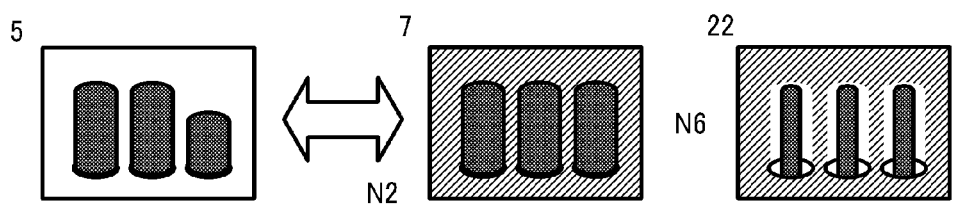

The masked image generator 359 performs masking processes on the obtained representative still image of frame number 7, and as illustrated in FIG. 17A, the abnormality detector 360 compares the representative still image with each of the reference images (frame numbers 2, 11, 15, 19, and 28) that have been classified as nontarget images (S116 of FIG. 3]). In this example, the representative still image of frame number 7 (i.e., target image to be monitored) has a difference in pixel value equal to or greater than a threshold α ("equal to or greater than α" in S116 of FIG. 3) when compared with any of the reference images that have been classified as nontarget images. Accordingly, as illustrated in FIG. 17B, the abnormality detector 360 then compares the target image to be monitored of frame number 5 with each of the reference images (frame numbers 7 and 22) that have been classified as object images to be detected (S118 of FIG. 3).

As a result of the comparison performed in step S118, the difference in pixel value with the reference image of frame number 7 is equal to or greater than a threshold β and smaller than a threshold γ, the differences in pixel value with the reference image of frame number 22 is equal to or greater than the threshold γ. Accordingly, the abnormality detection apparatus 300 detects an abnormality, and the alert generator 361 generates and outputs an alert (S120). After the alert is generated and output (S120), as illustrated in FIG. 17C, the abnormality detection apparatus 300 displays the target image to be monitored, the reference image that has been classified as an object image to be detected, and an image that indicates the difference therebetween (S121), and asks a user whether or not to continue the monitoring (S122).

Figure 17C:
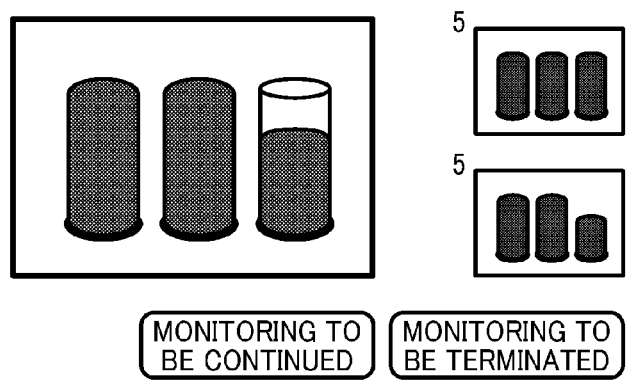

In the example of FIG. 17C, the image that indicates the difference is made of the target image to be monitored and a perspective drawing of the reference image. Although not illustrated in FIG. 17C, the abnormality detection apparatus 300 may display the time at which an abnormality is detected (time of event), the unique ID of the video (camera ID), or the like (see FIG. 23). As described above, the screen illustrated in FIG. 17C may be displayed not only on the monitor 500 but also on the display area of the externally connected device 600 such as a smartphone. Accordingly, a person in charge does not have to monitor the shop floor all the time, but can rush to the shop floor when an abnormality is detected.

Figure 18:
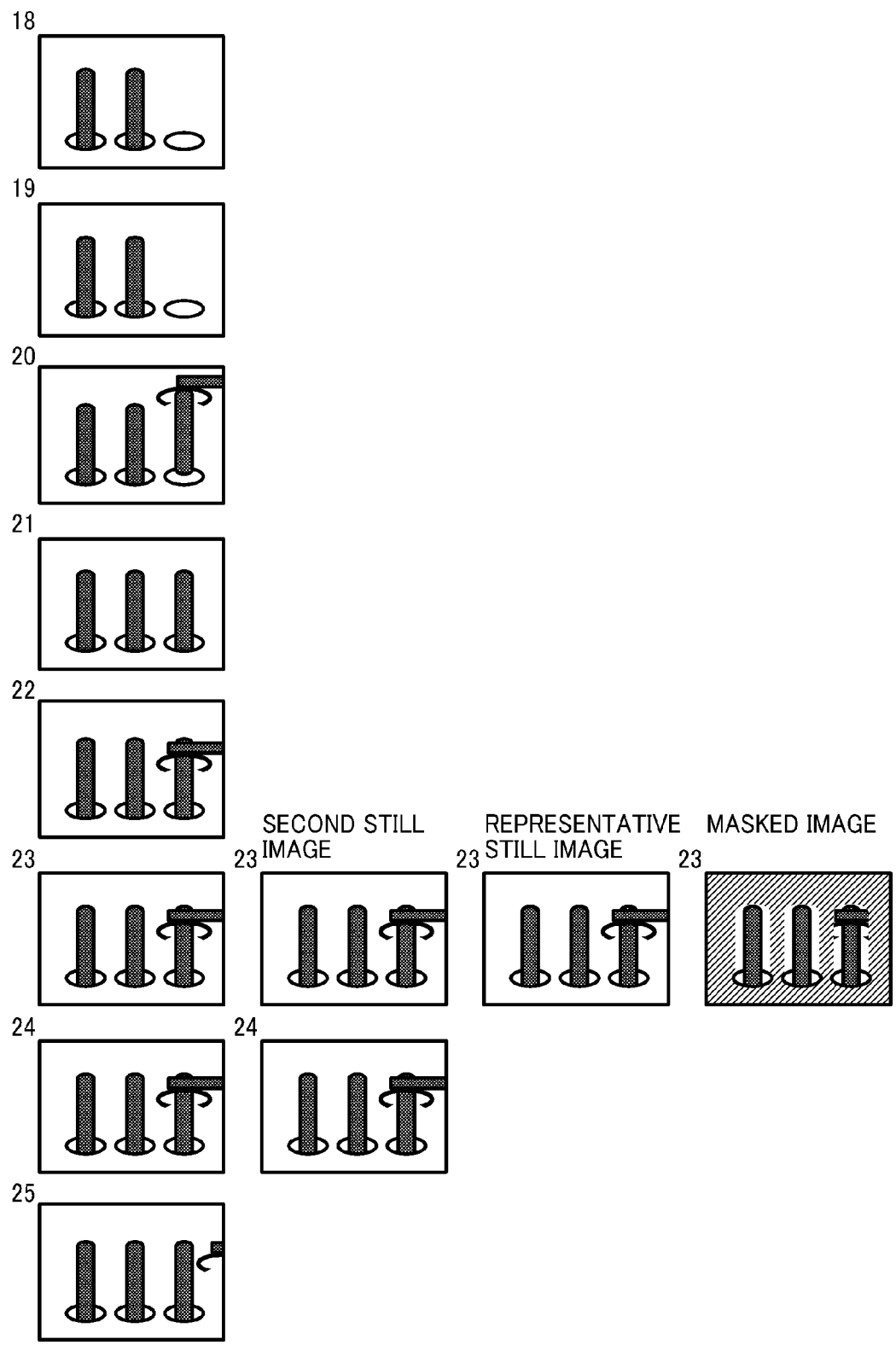
FIG. 18 illustrates the target video to be monitored (frame numbers 18 to 25) that is stored in a video data storage unit on a frame-by-frame basis, according to an example embodiment of the present invention.

After that, when the user decides to continue the monitoring ("YES" in S122), the frame of frame number 10 among the frames of the target video to be monitored is read from the video data storage unit 350, and the read frame of frame number 10 is compared with the frame of frame number 9 and still image data is generated. Subsequently, the frames of frame numbers 11, 12, 13 and the subsequent frame numbers are read and a still image interval is specified based on the result of comparison between the frames of frame numbers 24 and 25, and as illustrated in FIG. 18, the frames of frame numbers 22, 23, and 24 are extracted as still images. Further, the frame of frame number 23 is obtained as a representative still image based on the obtaining method of step S215 in FIG. 7 (S114 of FIG. 3).

Figure 19A:
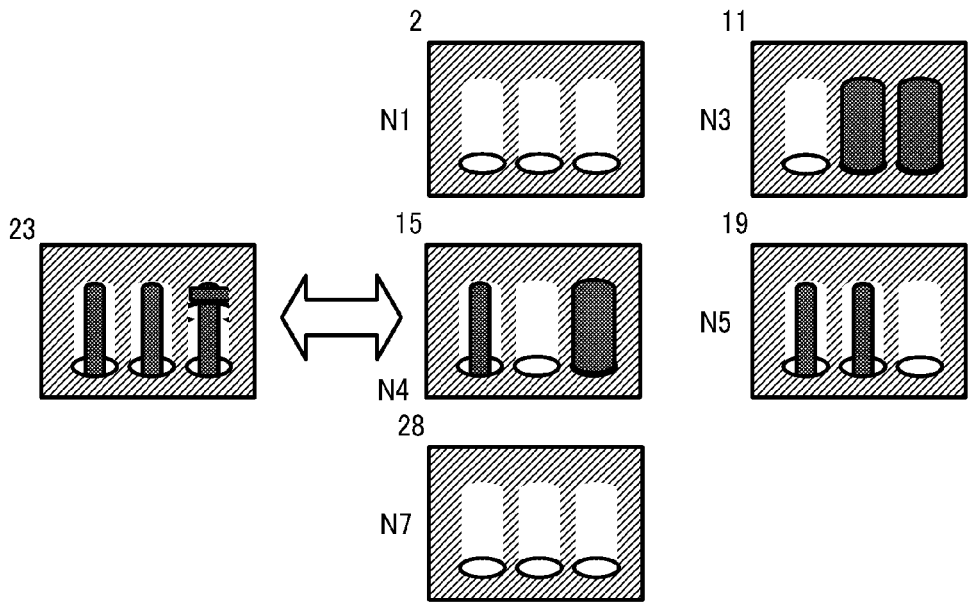
FIG. 19A, FIG. 19B, and FIG. 19C illustrate the processes of comparing a target image to be monitored with a reference image that has been classified as a nontarget image and an object image to be detected and the accompanying processes that are performed based on the results of the comparison, which are performed by an abnormality detector, according to an example embodiment of the present invention.
Figure 19B:
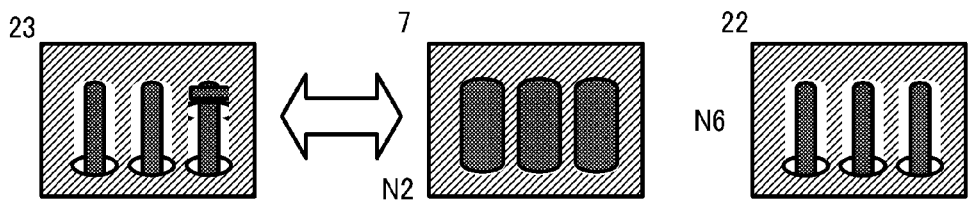

The masked image generator 359 of the abnormality detection apparatus 300 performs masking processes on the obtained representative still image of frame number 23, and as illustrated in FIG. 19A, the abnormality detector 360 compares the representative still image with each of the reference images (frame numbers 2, 11, 15, 19, and 28) that have been classified as nontarget images (S116 of FIG. 3]). In this example, the representative still image of frame number 23 (i.e., target image to be monitored) has a difference in pixel value equal to or greater than a threshold α ("equal to or greater than α" in S116 of FIG. 3) when compared with any of the reference images that have been classified as nontarget images. Accordingly, as illustrated in FIG. 19B, the abnormality detector 360 of the abnormality detection apparatus 300 then compares the target image to be monitored of frame number 23 with each of the reference images (frame numbers 7 and 22) that have been classified as object images to be detected (S118 of FIG. 3).

Figure 19C:
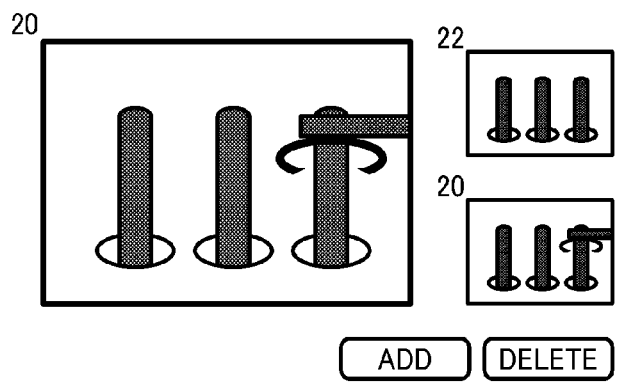
Figure 19D:
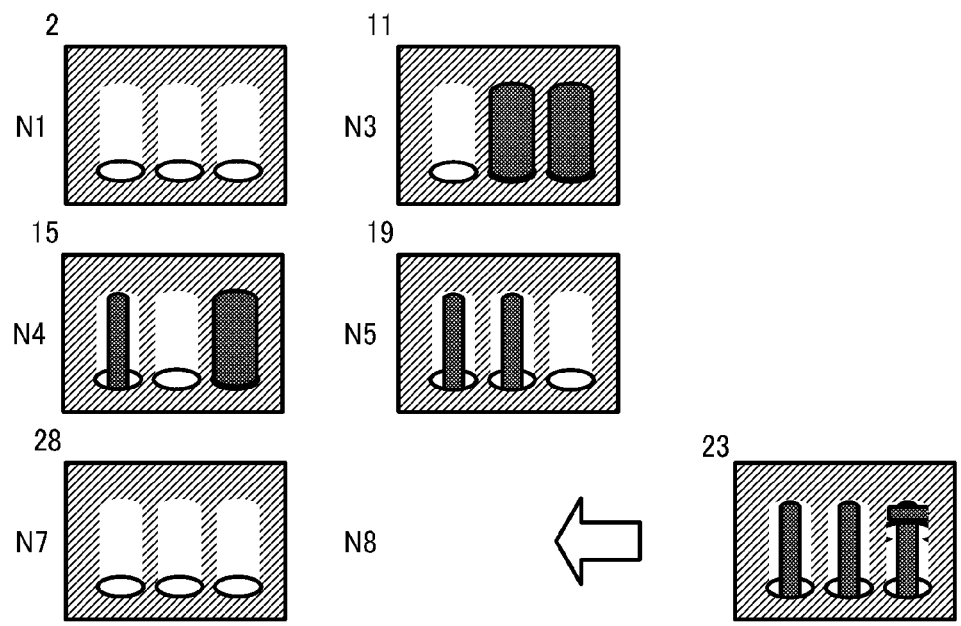
FIG. 19D illustrates the processes of comparing a target image to be monitored with a reference image that has been classified as a nontarget image and an object image to be detected and the accompanying processes that are performed based on the results of the comparison, which are performed by an abnormality detector, according to an example embodiment of the present invention.

As a result of the comparison performed in step S118, the difference in pixel value with the reference images of frame number 7 and 22 is equal to or greater than the threshold γ. Accordingly, as illustrated in FIG. 19C, the abnormality detection apparatus 300 displays the target image to be monitored, the reference image that has been classified as an object image to be detected, and an image that indicates the difference therebetween (S123 of FIG. 3), and asks the user to decide whether the target image to be monitored is to be added as a nontarget image of the reference images or to be deleted without adding (S124 of FIG. 3). When the user decides to add the displayed target image to be monitored as a nontarget image of the reference images ("YES" in S124), as illustrated in FIG. 19D, the abnormality detection apparatus 300 adds the target image to be monitored of frame number 23 as a nontarget image of the reference images (S125 of FIG. 3).

There are some cases in which whether a cylinder is properly set is checked in a still manner after the cylinder is set by machinery. As described above, even when the image of operation captured under normal operating conditions is selected as a reference image, the selected image is added as a nontarget image of the reference images (S125 of FIG. 3). By so doing, the time and labor that is later spent in checking by a user is reduced. More specifically, by adding the image captured under normal operating conditions as a nontarget image of the reference images (S125 of FIG. 3), when a similar case occurs later in the monitoring processes, the process shifts from step S116 of FIG. 3 to step S117 and the labor of the user related to step S124 of FIG. 3 can be eliminated.

Figure 20:
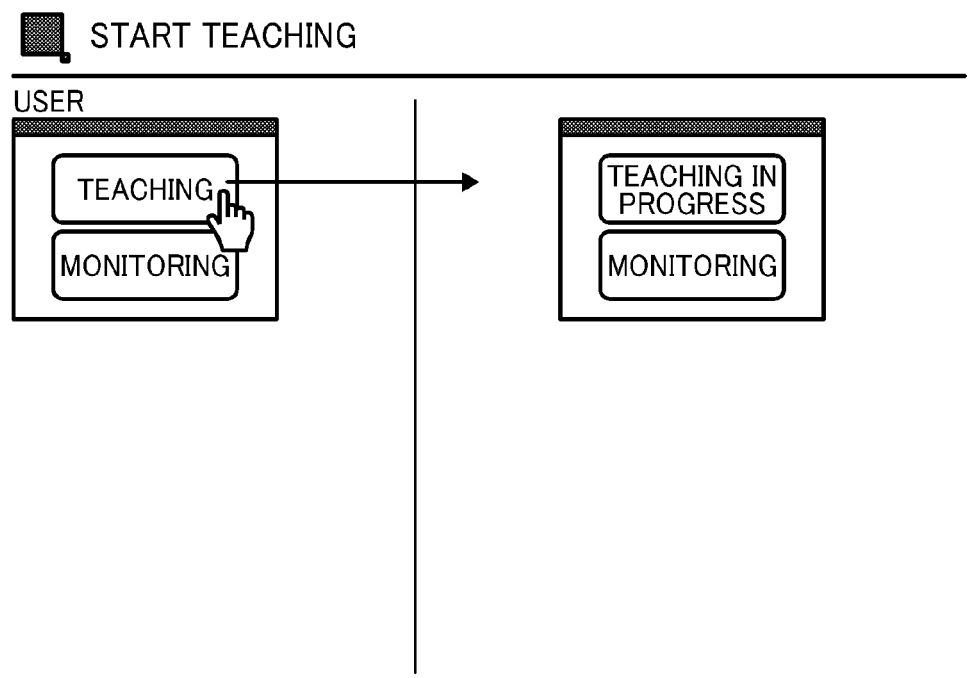
FIG. 20 is a diagram of a screen when a user selects "teaching" in the home screen of software, according to an example embodiment of the present invention.

Next, the operation of software using the display screen of the monitor 500 connected to the abnormality detection apparatus 300 according to the present example embodiment of the present invention is described with reference to FIG. 20 to FIG. 24. FIG. 20 is a diagram of a screen when a user selects "teaching" in the home screen of the software displayed on the monitor 500, according to the present example embodiment. When the "teaching" is selected on the home screen, the display is changed into "teaching in progress", and the abnormality detection apparatus 300 starts the processes from step S101 of FIG. 3.

Figure 21:
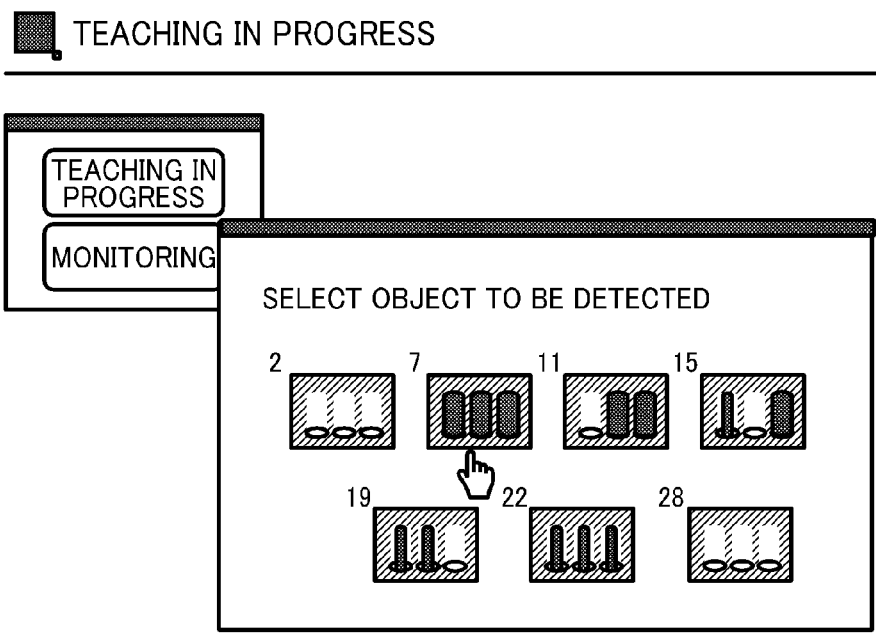
FIG. 21 is a diagram of a panel of options to be selected from among object images to be detected, according to an example embodiment of the present invention.

After a representative still image is obtained (S104 of FIG. 3), and a masked image is generated (S105 of FIG. 3) and masking processes are performed (S106 of FIG. 3), the abnormality detection apparatus 300 displays the representative still image on which the masking processes have been performed (S107 of FIG. 3) so as to ask the user to select an object image to be detected from the representative still images (i.e., reference images). FIG. 21 is a diagram of a panel of options to be selected from among object images to be detected, displayed on the monitor 500, according to the present example embodiment. Once masking processes are finished, a panel of options to be selected from among object images to be detected pops up as a new window as illustrated in FIG. 21. In FIG. 21, a user selects the reference image of frame number 7 as an object image to be detected. In FIG. 21, it is assumed that the user selects the reference images of frame numbers 7 and 22 as object images to be detected, in a similar manner to FIG. 13.

Figure 22:
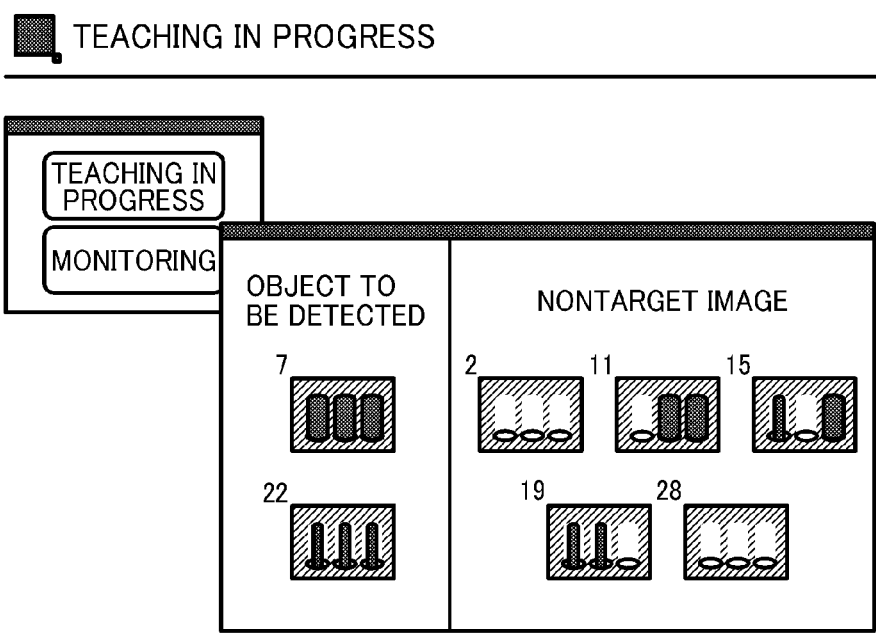
FIG. 22 is a diagram of a window displaying a result of classification into object images to be detected and nontarget images, according to an example embodiment of the present invention.

Once the object images to be detected are selected (classified) by the user, the abnormality detection apparatus 300 displays the result of the classification on the monitor 500. FIG. 22 is a diagram of a panel of a result of classification into object images to be detected and nontarget images, displayed on the monitor 500, according to the present example embodiment. As illustrated in FIG. 22, a result of the classification into object images to be detected and nontarget images pops up as a new window. Note that the displaying processes of FIG. 22 are supplementary processes, and thus are not illustrated in the processing flow of FIG. 3.

Figure 23:
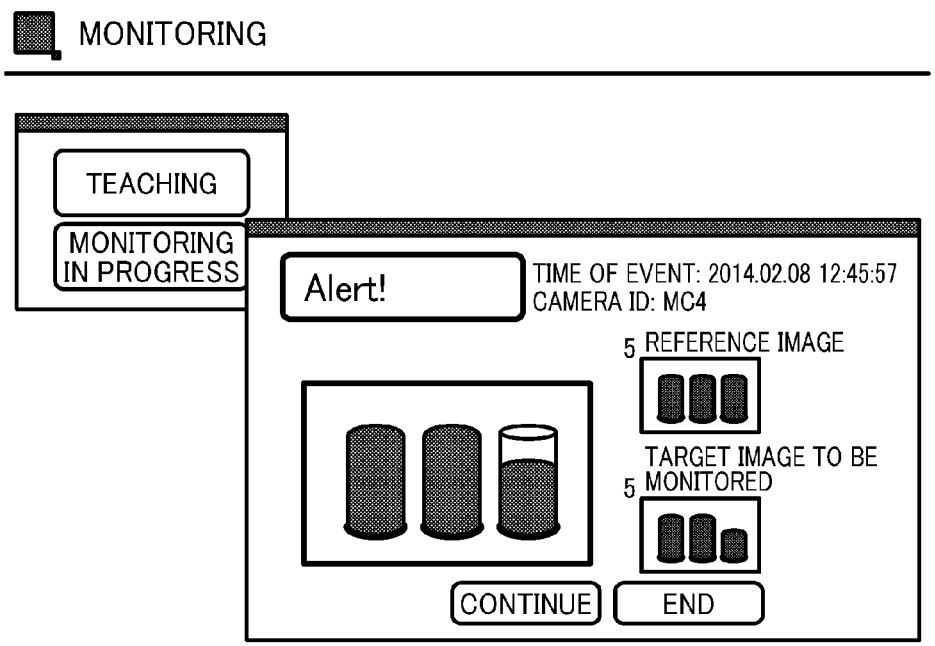
FIG. 23 is a diagram of a window when an abnormality is detected after a user selects "monitoring", according to an example embodiment of the present invention.

When the classification into object images to be detected and nontarget images has been performed (i.e., when the classification into object images to be detected and nontarget images has been performed and the result of the classification is displayed on the screen), the user selects "monitoring". FIG. 23 is a diagram of a screen when an abnormality is detected after the user selects "monitoring" in the home screen of the software displayed on the monitor 500, according to the present example embodiment. When the "monitoring" is selected on the home screen, the display is changed into "monitoring in progress", and the abnormality detection apparatus 300 starts the processes from step S110 of FIG. 3.

When monitoring is performed and an abnormality is detected (equal to or greater than β but smaller than γ in S118 of FIG. 3), the abnormality detection apparatus 300 generates and outputs an alert, and pops up as a new window in which the difference between a target image to be monitored and a reference image is indicated as illustrated in FIG. 23. In the pop-up window illustrated in FIG. 23, the difference between a target image to be monitored and a reference image at the time when the alert is generated and output is indicated. In addition to the image in which the difference is indicated, a target image to be monitored, a reference image, time at which an abnormality is detected, the unique identification (ID) of the video that records the target image to be monitored, and the buttons by which whether or not to continue the monitoring is selected are displayed in the pop-up window.

Figure 24:
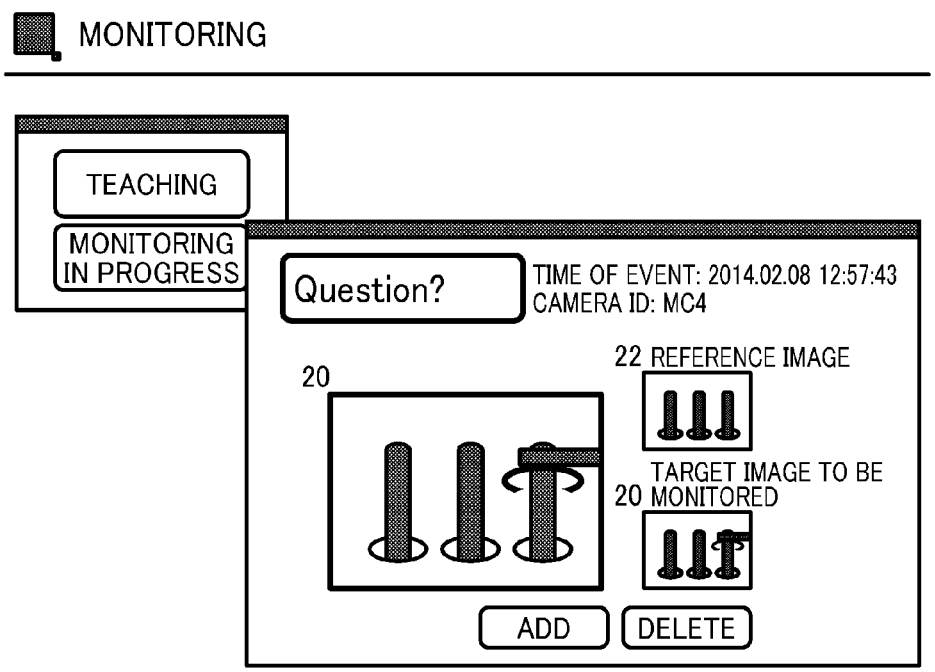
FIG. 24 is a diagram where a user is asked whether or not to add a target image to be monitored, according to an example embodiment of the present invention.

After the "monitoring" is selected by the user and it is determined to be equal to or greater than γ in step S118 of FIG. 3, the abnormality detection apparatus 300 asks the user whether or not to add the target image to be monitored as a nontarget image of the reference images. FIG. 24 is a diagram where a user is asked whether or not to add a target image to be monitored, according to an example embodiment of the present invention. As illustrated in FIG. 24, a screen that asks the user to determine whether or not to add a target image to be monitored as a nontarget image pops up as a new window.

As described above, with the abnormality detection apparatus according to the example embodiments of the present invention, a target video to be monitored is compared with a reference video, and an image that indicates the difference between a target image to be monitored obtained from the target video to be monitored and a reference image obtained from the reference video can be displayed in abnormality detection. Accordingly, a user can easily and precisely keep track of an abnormality, and can appropriately deal with the abnormality. When live video is monitored, in particular, an abnormality can instantly be detected, and the detected abnormality can promptly and precisely be dealt with. The abnormality detection apparatus according to the example embodiments of the present invention can be applied to a wider range of fields such as safety management, quality control, and production control.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, read only memory (ROM), etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An abnormality detection apparatus comprising:
a still image extraction unit configured to process video data of a reference video that records an object for a first period of time, to determine a first interval within the first period of time for which the object is stationary in the reference video, to extract a reference image that illustrates the object during the first interval, to process video data of a target video that records the object for a second period of time that is different from the first period of time, to determine a second interval within the second period of time for which the object is stationary in the target video, and to extract a target image that illustrates the object during the second interval;

an abnormality detector configured to detect an abnormality based on a difference between the target image and the reference image; and a display controller configured to, in response to detection of the abnormality, display the target image and the reference image on a monitor.

2. The abnormality detection apparatus according to claim 1, wherein the apparatus further comprises a unit configured to classify images from the first interval into one of an object image to be used for the abnormality detection and a nontarget image not to be used for the abnormality detection.

3. The abnormality detection apparatus according to claim 2, wherein the abnormality detector performs abnormality detection based on the object image and the target image only when a difference between the nontarget image and the target image is equal to or greater than a prescribed threshold.

4. The abnormality detection apparatus according to claim 1, further comprising: a masked image generator configured to generate a masked image where masking processes are performed on an area other than an object area to be detected in the reference image, and to combine the masked image with each one of the reference image and the target image.

5. The abnormality detection apparatus according to claim 3, wherein the abnormality detector replaces the reference image with the target image when a difference between the nontarget image and the target image is equal to or greater than the prescribed threshold.

6. The abnormality detection apparatus according to claim 1, wherein the abnormality detector detects an abnormality in the target image or replaces the reference image according to a level of a difference between the target image and the reference image.

7. A method of detecting an abnormality, the method comprising:

processing video data of a reference video that records an object for a first period of time;

determining a first interval within the first period of time for which the object is stationary in the reference video;

extracting a reference image that illustrates the object during the first interval;

processing video data of a target video that records the object for a second period of time that is different from the first period of time;

determining a second interval within the second period of time for which the object is stationary in the target video;

extracting a target image that illustrates the object during the second interval;

detecting an abnormality based on a difference between the target image and the reference image; and in response to detecting the abnormality, displaying the target image and the reference image on a monitor.

8. The method according to claim 7, wherein the method further comprises classifying images from the first interval into one of an object image to be used for the abnormality detection and a nontarget image not to be used for the abnormality detection.

9. The method according to claim 8, wherein the detecting includes performing abnormality detection based on the object image and the target image only when a difference between the nontarget image and the target image is equal to or greater than a prescribed threshold.

10. The method according to claim 7, further comprising: generating a masked image where masking processes are performed on an area other than an object area to be detected in the reference image, and combining the masked image with each one of the reference image and the target image.

11. The method according to claim 9, wherein the detecting includes replacing the reference image with the target image when a difference between the nontarget image and the target image is equal to or greater than the prescribed threshold.

12. The method according to claim 7, wherein the abnormality detector detects an abnormality in the target image or replaces the reference image according to a level of a difference between the target image and the reference image.

13. A computer-readable non-transitory recording medium storing a program for causing a computer to execute an image processing method, the method comprising:

processing video data of a reference video that records an object for a first period of time;

determining a first interval within the first period of time for which the object is stationary in the reference video;

extracting a reference image that illustrates the object during the first interval;

processing video data of a target video that records the object for a second period of time that is different from the first period of time;

determining a second interval within the second period of time for which the object is stationary in the target video;

extracting a target image that illustrates the object during the second interval;

detecting an abnormality based on a difference between the target image and the reference image; and in response to detecting the abnormality, displaying the target image and the reference image on a monitor.

14. An abnormality detection system comprising:

the abnormality detection apparatus according to claim 1; and a monitor.

15. The abnormality detection apparatus according to claim 1, wherein the display controller displays the target image and the reference image in a row.

16. The abnormality detection apparatus according to claim 1, wherein the display controller displays an image indicating a difference between the target image and the reference image.

* * * * *